(12) United States Patent
McLachlan

(10) Patent No.: US 12,118,562 B2
(45) Date of Patent: Oct. 15, 2024

(54) CONFIGURING AN ACCOUNT FOR A SECOND USER IDENTITY

(71) Applicant: Apple Inc., Cupertino, CA (US)

(72) Inventor: Mischa McLachlan, San Francisco, CA (US)

(73) Assignee: Apple Inc., Cupertino, CA (US)

(*) Notice: Subject to any disclaimer, the term of this patent is extended or adjusted under 35 U.S.C. 154(b) by 220 days.

(21) Appl. No.: 17/101,941

(22) Filed: Nov. 23, 2020

(65) Prior Publication Data

US 2021/0374744 A1 Dec. 2, 2021

Related U.S. Application Data

(60) Provisional application No. 63/032,399, filed on May 29, 2020.

(51) Int. Cl.
*G06Q 20/40* (2012.01)
*G06F 3/0482* (2013.01)
(Continued)

(52) U.S. Cl.
CPC ......... *G06Q 20/405* (2013.01); *G06F 3/0482* (2013.01); *G06F 9/451* (2018.02);
(Continued)

(58) Field of Classification Search
None
See application file for complete search history.

(56) References Cited

U.S. PATENT DOCUMENTS 3,586,261 A 6/1971 Paine et al.
4,516,207 A 5/1985 Moriyama et al.
(Continued)

FOREIGN PATENT DOCUMENTS

AU 2005256796 A1 1/2006
AU 2017101425 A4 11/2017
(Continued)

OTHER PUBLICATIONS

Andreas Daniel Hartl, Efficient Verification of Holograms Using Mobile Augmented Reality, 2015, IEEE Transactions on Visualization and Computer Graphics, vol. 22, No. 7, 9 pages (Year: 2015).*
(Continued)

*Primary Examiner* — Benjamin S Brindley
(74) *Attorney, Agent, or Firm* — DLA Piper LLP (US)

(57) ABSTRACT

The present disclosure generally relates to a computer system associated with a first user identity and a user interface for configuring an account for use by one or more devices associated with a second user identity. The user interface includes a control for selecting between a first account option that enables transfers between the account and only a first set of user accounts and a second account option that enables transfers between the account and a second set of user accounts, the second set of user accounts including the first set of user accounts and one or more additional user accounts associated with additional users. In response to receiving a request to configure the account, the account is configured with the first account option when the first account option is selected and the account is configured with the second account option when the second account option is selected.

50 Claims, 22 Drawing Sheets

(51) Int. Cl.
*G06F 9/451* (2018.01)
*G06Q 20/10* (2012.01)
*G06Q 40/02* (2023.01)
*H04L 9/40* (2022.01)
*G06Q 20/32* (2012.01)

(52) U.S. Cl.
CPC ........... *G06Q 20/108* (2013.01); *G06Q 40/02* (2013.01); *H04L 63/102* (2013.01); *G06Q 20/3267* (2020.05)

(56) References Cited

U.S. PATENT DOCUMENTS

| | | |
|---|---|---|
| 5,802,208 A | 9/1998 | Podilchuk et al. |
| 6,076,928 A | 6/2000 | Fateh et al. |
| 6,212,548 B1 | 4/2001 | Desimone et al. |
| 6,256,129 B1 | 7/2001 | Kim et al. |
| 6,612,928 B1 | 9/2003 | Bradford et al. |
| 6,822,769 B1 | 11/2004 | Drinkwater et al. |
| 6,993,489 B1 | 1/2006 | Miglautsch |
| 7,529,563 B1 | 5/2009 | Pitroda |
| 7,664,638 B2 | 2/2010 | Cooper et al. |
| 8,126,806 B1 | 2/2012 | DiMartino et al. |
| 8,464,934 B2 † | 6/2013 | Watkins |
| 8,827,153 B1 | 9/2014 | Rhoades et al. |
| 8,959,360 B1 | 2/2015 | Barra |
| 9,117,242 B1 | 8/2015 | Ellis et al. |
| 9,123,272 B1 | 9/2015 | Baldwin et al. |
| 9,189,778 B1 | 11/2015 | Sh. Al-Rashidi |
| 9,779,585 B2 | 10/2017 | Dupuis et al. |
| 9,825,934 B1 | 11/2017 | Alexander |
| 9,842,330 B1 | 12/2017 | Van Os et al. |
| 9,923,930 B2 | 3/2018 | Zhang et al. |
| 10,032,100 B2 | 7/2018 | Mullen et al. |
| 10,223,631 B2 | 3/2019 | Mullen et al. |
| 10,255,545 B2 | 4/2019 | Mullen et al. |
| 10,319,203 B1 | 6/2019 | Testanero et al. |
| 10,783,576 B1 | 9/2020 | Van Os et al. |
| 2004/0006479 A1 | 1/2004 | Tanaka |
| 2004/0225609 A1 | 11/2004 | Greene |
| 2005/0131816 A1 | 6/2005 | Britto et al. |
| 2005/0210394 A1 | 9/2005 | Crandall et al. |
| 2005/0219223 A1 | 10/2005 | Kotzin et al. |
| 2005/0244059 A1 | 11/2005 | Turski |
| 2006/0149546 A1 | 7/2006 | Runge et al. |
| 2008/0208681 A1 | 8/2008 | Hammad et al. |
| 2008/0231429 A1 | 9/2008 | Leonard et al. |
| 2009/0005011 A1 | 1/2009 | Christie et al. |
| 2009/0048959 A1 | 2/2009 | Omura et al. |
| 2009/0050687 A1 | 2/2009 | Kon et al. |
| 2009/0094134 A1 | 4/2009 | Toomer et al. |
| 2009/0119678 A1 | 5/2009 | Shih et al. |
| 2009/0227296 A1 | 9/2009 | Kim |
| 2010/0001980 A1 | 1/2010 | Kim et al. |
| 2010/0064259 A1 | 3/2010 | Alexanderovitc et al. |
| 2010/0078472 A1 | 4/2010 | Lin et al. |
| 2010/0082481 A1* | 4/2010 | Lin .................... G06Q 20/3278 705/41 |
| 2010/0217808 A1 | 8/2010 | Benninger |
| 2011/0166992 A1 | 7/2011 | Dessert et al. |
| 2011/0179126 A1 | 7/2011 | Wetherell et al. |
| 2011/0282697 A1 | 11/2011 | Fitzgerald et al. |
| 2012/0036433 A1 | 2/2012 | Zimmer et al. |
| 2012/0078788 A1 | 3/2012 | Gandhi |
| 2012/0095918 A1 | 4/2012 | Jurss |
| 2012/0110456 A1 | 5/2012 | Larco et al. |
| 2012/0136781 A1 | 5/2012 | Fridman et al. |
| 2012/0150750 A1 | 6/2012 | Law et al. |
| 2012/0197740 A1 | 8/2012 | Grigg et al. |
| 2012/0197743 A1 | 8/2012 | Grigg et al. |
| 2012/0197794 A1* | 8/2012 | Grigg .................. G06Q 20/108 705/41 |
| 2012/0203605 A1 | 8/2012 | Morgan et al. |
| 2012/0245941 A1 | 9/2012 | Cheyer |
| 2012/0310760 A1 | 12/2012 | Phillips et al. |
| 2012/0330830 A1 | 12/2012 | Mason et al. |
| 2013/0006848 A1* | 1/2013 | Kuttuva ............. G06Q 20/3223 705/39 |
| 2013/0018792 A1* | 1/2013 | Casey .................... G06Q 40/02 705/44 |
| 2013/0019204 A1 | 1/2013 | Kotler et al. |
| 2013/0024364 A1 | 1/2013 | Shrivastava et al. |
| 2013/0024371 A1 | 1/2013 | Hariramani et al. |
| 2013/0060690 A1* | 3/2013 | Oskolkov ............ G06Q 20/386 705/42 |
| 2013/0091443 A1 | 4/2013 | Park et al. |
| 2013/0151360 A1 | 6/2013 | Scipioni et al. |
| 2013/0151636 A1 | 6/2013 | Majeti et al. |
| 2013/0159178 A1 | 6/2013 | Colon et al. |
| 2013/0200146 A1 | 8/2013 | Moghadam et al. |
| 2013/0218721 A1 | 8/2013 | Borhan et al. |
| 2013/0246954 A1 | 9/2013 | Gray et al. |
| 2013/0275300 A1 | 10/2013 | Killian et al. |
| 2014/0006285 A1 | 1/2014 | Chi et al. |
| 2014/0019352 A1 | 1/2014 | Shrivastava |
| 2014/0020068 A1 | 1/2014 | Desai et al. |
| 2014/0043547 A1 | 2/2014 | Marhefka |
| 2014/0052794 A1 | 2/2014 | Tucker et al. |
| 2014/0061299 A1 | 3/2014 | Scipioni |
| 2014/0067654 A1 | 3/2014 | Hanson et al. |
| 2014/0122331 A1 | 5/2014 | Vaish et al. |
| 2014/0162595 A1* | 6/2014 | Raleigh ................ H04W 8/18 455/405 |
| 2014/0207679 A1 | 7/2014 | Cho |
| 2014/0215361 A1 | 7/2014 | Hwang et al. |
| 2014/0244495 A1 | 8/2014 | Davis et al. |
| 2014/0279474 A1 | 9/2014 | Evans et al. |
| 2014/0279530 A1 | 9/2014 | Douglas et al. |
| 2014/0279543 A1 | 9/2014 | Ruhrig |
| 2014/0359456 A1 | 12/2014 | Thiele et al. |
| 2014/0372920 A1 | 12/2014 | Choi et al. |
| 2014/0379341 A1 | 12/2014 | Seo et al. |
| 2015/0003595 A1 | 1/2015 | Yaghi et al. |
| 2015/0005039 A1 | 1/2015 | Liu et al. |
| 2015/0044964 A1 | 2/2015 | Khan et al. |
| 2015/0046989 A1 | 2/2015 | Oberheide et al. |
| 2015/0098309 A1 | 4/2015 | Adams et al. |
| 2015/0115028 A1 | 4/2015 | Montealegre |
| 2015/0127550 A1 | 5/2015 | Khan |
| 2015/0213560 A1 | 7/2015 | Aabye et al. |
| 2015/0264111 A1 | 9/2015 | Aleksandrov |
| 2015/0278814 A1 | 10/2015 | Jaffe |
| 2015/0340025 A1 | 11/2015 | Shima |
| 2015/0348001 A1 | 12/2015 | Van Os et al. |
| 2015/0348002 A1 | 12/2015 | Van et al. |
| 2015/0348185 A1* | 12/2015 | Frost ...................... G06Q 40/02 705/35 |
| 2015/0358207 A1 | 12/2015 | Baldock et al. |
| 2016/0011768 A1 | 1/2016 | Yim et al. |
| 2016/0055487 A1 | 2/2016 | Votaw et al. |
| 2016/0080525 A1 | 3/2016 | Ward |
| 2016/0086166 A1 | 3/2016 | Pomeroy et al. |
| 2016/0104159 A1 | 4/2016 | Butterfield et al. |
| 2016/0117670 A1 | 4/2016 | Davis |
| 2016/0156574 A1 | 6/2016 | Hum et al. |
| 2016/0171481 A1 | 6/2016 | Mcelmurry et al. |
| 2016/0180316 A1 | 6/2016 | Wang et al. |
| 2016/0180325 A1 | 6/2016 | Davis et al. |
| 2016/0180578 A1 | 6/2016 | Vegesna |
| 2016/0189717 A1 | 6/2016 | Kannan et al. |
| 2016/0203483 A1 | 7/2016 | Bridgewater et al. |
| 2016/0210623 A1 | 7/2016 | Voege |
| 2016/0225371 A1 | 8/2016 | Agrawal et al. |
| 2016/0232516 A1 | 8/2016 | Dayan et al. |
| 2016/0259531 A1 | 9/2016 | Cho et al. |
| 2016/0260031 A1 | 9/2016 | Pace et al. |
| 2016/0267447 A1 | 9/2016 | Davis et al. |
| 2016/0277342 A1 | 9/2016 | Shi |
| 2016/0342992 A1* | 11/2016 | Lee ........................ G06Q 20/367 |
| 2016/0352667 A1 | 12/2016 | Pickett et al. |
| 2016/0358167 A1 | 12/2016 | Van Os et al. |
| 2016/0364715 A1 | 12/2016 | Cho et al. |
| 2016/0378186 A1 | 12/2016 | Kim |
| 2017/0004484 A1 | 1/2017 | Seol et al. |

(56) References Cited

U.S. PATENT DOCUMENTS

| | | |
|---|---|---|
| 2017/0017958 A1 | 1/2017 | Scott et al. |
| 2017/0046111 A1 | 2/2017 | Chu et al. |
| 2017/0061405 A1 | 3/2017 | Bryant |
| 2017/0091745 A1 | 3/2017 | Castinado et al. |
| 2017/0123498 A1 | 5/2017 | Dillon et al. |
| 2017/0180813 A1 | 6/2017 | Kang et al. |
| 2017/0193501 A1 | 7/2017 | Cole et al. |
| 2017/0228704 A1 | 8/2017 | Zhou et al. |
| 2017/0228710 A1* | 8/2017 | Lee .................. G06Q 20/36 |
| 2017/0235935 A1 | 8/2017 | Song et al. |
| 2017/0235936 A1 | 8/2017 | De Los Rios et al. |
| 2017/0237692 A1 | 8/2017 | Sheth et al. |
| 2017/0339347 A1 | 11/2017 | Cho et al. |
| 2017/0344526 A1 | 11/2017 | Smith et al. |
| 2017/0357443 A1 | 12/2017 | Paek et al. |
| 2018/0053157 A1 | 2/2018 | Roffey |
| 2018/0053169 A1 | 2/2018 | James |
| 2018/0053177 A1 | 2/2018 | Feng et al. |
| 2018/0068313 A1 | 3/2018 | Van Os et al. |
| 2018/0082282 A1 | 3/2018 | Van Os et al. |
| 2018/0082285 A1 | 3/2018 | Prabhakar et al. |
| 2018/0107372 A1 | 4/2018 | Van Damme et al. |
| 2018/0109482 A1 | 4/2018 | Deluca et al. |
| 2018/0157395 A1 | 6/2018 | Mhun et al. |
| 2018/0218359 A1 | 8/2018 | Kim et al. |
| 2018/0240086 A1 | 8/2018 | Sobotka |
| 2018/0300101 A1 | 10/2018 | Liu et al. |
| 2018/0335928 A1 | 11/2018 | Van Os et al. |
| 2018/0336543 A1 | 11/2018 | Van Os et al. |
| 2018/0374096 A1 | 12/2018 | Demaret et al. |
| 2019/0095883 A1 | 3/2019 | Robinson et al. |
| 2019/0149539 A1 | 5/2019 | Scruby |
| 2019/0370781 A1 | 12/2019 | Van Os et al. |
| 2019/0370805 A1 | 12/2019 | Van Os et al. |
| 2020/0143353 A1 | 5/2020 | Van Os et al. |
| 2020/0302517 A1 | 9/2020 | Van Os et al. |
| 2020/0302519 A1 | 9/2020 | Van Os et al. |
| 2021/0004897 A1 | 1/2021 | Van Os et al. |
| 2021/0027269 A1 | 1/2021 | Van Os et al. |
| 2021/0125173 A1 | 4/2021 | Van Os et al. |
| 2021/0201288 A1 | 7/2021 | Van Os et al. |
| 2021/0272092 A1 | 9/2021 | Van Os et al. |

FOREIGN PATENT DOCUMENTS

| | | |
|---|---|---|
| CN | 102541438 A | 7/2012 |
| CN | 105320864 A | 2/2016 |
| CN | 105787718 A | 7/2016 |
| CN | 105844468 A | 8/2016 |
| EP | 2980741 A1 | 2/2016 |
| EP | 3062271 A1 | 8/2016 |
| EP | 3096275 A1 | 11/2016 |
| EP | 3047622 B1 | 8/2017 |
| EP | 3349400 A1 | 7/2018 |
| EP | 3605423 A1 | 2/2020 |
| GB | 2528948 A | 2/2016 |
| JP | 2003-67210 A | 3/2003 |
| JP | 2004-37998 A | 2/2004 |
| JP | 2004-287594 A | 10/2004 |
| JP | 2007-157045 A | 6/2007 |
| JP | 2007-226794 A | 9/2007 |
| JP | 2011-503711 A | 1/2011 |
| JP | 2012-248130 A | 12/2012 |
| JP | 2013-157959 A | 8/2013 |
| JP | 2013-229656 A | 11/2013 |
| JP | 2013-257878 A | 12/2013 |
| JP | 2014-517366 A | 7/2014 |
| JP | 2014-520296 A | 8/2014 |
| JP | 2015-121997 A | 7/2015 |
| JP | 2015-534664 A | 12/2015 |
| JP | 2016-12902 A | 1/2016 |
| JP | 2016-53766 A | 4/2016 |
| JP | 2016-71655 A | 5/2016 |
| JP | 2017-41098 A | 2/2017 |
| JP | 2018-506103 A | 3/2018 |
| JP | 2018-524679 A | 8/2018 |
| KR | 10-2004-0027236 A | 4/2004 |
| KR | 10-2014-0001515 A | 1/2014 |
| KR | 10-2014-0131093 A | 11/2014 |
| KR | 10-2014-0139982 A | 12/2014 |
| KR | 10-2015-0014788 A | 2/2015 |
| KR | 10-2016-0054573 A | 5/2016 |
| KR | 10-2016-0076201 A | 6/2016 |
| KR | 10-2016-0099397 A | 8/2016 |
| KR | 10-2016-0105279 A | 9/2016 |
| KR | 10-2017-0011784 A | 2/2017 |
| KR | 10-2017-0103997 A | 9/2017 |
| KR | 10-2018-0051556 A | 5/2018 |
| WO | 2011/037134 A1 | 3/2011 |
| WO | 2012/129231 A1 | 9/2012 |
| WO | 2012/135796 A1 | 10/2012 |
| WO | 2013/184840 A2 | 12/2013 |
| WO | 2014/033939 A1 | 3/2014 |
| WO | 2014/172757 A1 | 10/2014 |
| WO | 2015/057320 A1 | 4/2015 |
| WO | 2015/187608 A1 | 12/2015 |
| WO | 2016/032534 A1 | 3/2016 |
| WO | 2016/126775 A1 | 8/2016 |
| WO | 2016/129938 A1 | 8/2016 |
| WO | 2017/030642 A1 | 2/2017 |
| WO | 2017/041641 A1 | 3/2017 |
| WO | 2017/072589 A2 | 5/2017 |
| WO | 2017/078792 A1 | 5/2017 |
| WO | 2017/154331 A1 | 9/2017 |

OTHER PUBLICATIONS

Applicant Initiated Interview Summary received for U.S. Appl. No. 15/884,195, mailed on Dec. 17, 2020, 3 pages.
International Preliminary Report on Patentability received for PCT Patent Application No. PCT/US2019/024702, mailed on Dec. 17, 2020, 12 pages.
International Preliminary Report on Patentability received for PCT Patent Application No. PCT/US2019/035064, mailed on Dec. 17, 2020, 9 pages.
Office Action received for Chinese Patent Application No. 202010174749.3, mailed on Nov. 6, 2020, 9 pages (3 pages of English Translation and 6 pages of Official Copy).
Office Action received for European Patent Application No. 18730556.0, mailed on Dec. 16, 2020, 7 pages.
Applicant Initiated Interview Summary received for U.S. Appl. No. 16/581,614, mailed on May 18, 2021, 2 pages.
Non-Final Office Action received for U.S. Appl. No. 15/884,195, mailed on May 18, 2021, 26 pages.
Office Action received for Korean Patent Application No. 10-2021-7011434, mailed on Apr. 28, 2021, 6 pages (2 pages of English Translation and 4 pages of Official Copy).
Final Office Action received for U.S. Appl. No. 16/581,614, mailed on Aug. 27, 2021, 18 pages.
Notice of Allowance received for U.S. Appl. No. 16/549,862, mailed on Aug. 26, 2021, 2 pages.
Office Action received for Danish Patent Application No. PA201770505, mailed on Aug. 18, 2021, 2 pages.
International Search Report and written Opinion received for PCT Patent Application No. PCT/US2021/032299, mailed on Sep. 3, 2021, 15 pages.
Applicant Initiated Interview Summary received for U.S. Appl. No. 15/884,195, mailed on Aug. 17, 2021, 4 pages.
Notice of Allowance received for Korean Patent Application No. 10-2021-7011434, mailed on Jul. 29, 2021, 5 pages (2 pages of English Translation and 3 pages of Official Copy).
Notice of Allowance received for U.S. Appl. No. 16/549,862, mailed on Aug. 13, 2021, 7 pages.
Non-Final Office Action received for U.S. Appl. No. 17/027,274, mailed on Jan. 4, 2022, 23 pages.
Notice of Allowance received for Korean Patent Application No. 10-2021-7035417, mailed on Jan. 3, 2022, 5 pages (1 page of English Translation and 4 pages of Official Copy).

(56) References Cited

OTHER PUBLICATIONS

Office Action received for Japanese Patent Application No. 2020-566976, mailed on Jan. 6, 2022, 11 pages (06 pages of English Translation and 05 pages of Official Copy).
Applicant-Initiated Interview Summary received for U.S. Appl. No. 16/152,139, mailed on Jan. 13, 2021, 3 pages.
Office Action received for Korean Patent Application No. 10-2019-7006639, mailed on Dec. 21, 2020, 20 pages (10 pages of English Translation and 10 pages of Official Copy).
Decision to Grant received for Danish Patent Application No. PA201770502, mailed on Feb. 25, 2021, 2 pages.
European Search Report received for European Patent Application No. 20204436.8, mailed on Mar. 9, 2021, 5 pages.
Final Office Action received for U.S. Appl. No. 15/884,195, mailed on Feb. 22, 2021, 26 pages.
Hartl et al., "Efficient Verification of Holograms Using Mobile Augmented Reality", IEEE Transactions on Visualization and Computer Graphics, vol. 22, No. 7, Online available at: https://arbook.icg.tugraz.at/schmalstieg/Schmalstieg_302.pdf, 2015, 9 pages.
Non-Final Office Action received for U.S. Appl. No. 16/549,862, mailed on Mar. 8, 2021, 23 pages.
Notice of Allowance received for U.S. Appl. No. 15/823,269, mailed on Feb. 22, 2021, 7 pages.
Notice of Allowance received for U.S. Appl. No. 15/823,269, mailed on Mar. 10, 2021, 6 pages.
Notice of Allowance received for U.S. Appl. No. 16/152,139, mailed on Feb. 23, 2021, 9 pages.
Notice of Allowance received for U.S. Appl. No. 16/736,704, mailed on Feb. 23, 2021, 11 pages.
Office Action received for Australian Patent Application No. 2017324176, mailed on Feb. 25, 2021, 6 pages.
International Preliminary Report on Patentability received for PCT Patent Application No. PCT/US2021/032299, mailed on Dec. 8, 2022, 11 pages.
Advisory Action received for U.S. Appl. No. 15/274,910, mailed on Aug. 12, 2019, 3 pages.
Advisory Action received for U.S. Appl. No. 16/581,614, mailed on Sep. 11, 2020, 8 pages.
Applicant Initiated Interview Summary received for U.S. Appl. No. 15/823,269, mailed on Sep. 17, 2020, 3 pages.
Applicant Initiated Interview Summary received for U.S. Appl. No. 15/884,195, mailed on Apr. 28, 2020, 5 pages.
Applicant Initiated Interview Summary received for U.S. Appl. No. 15/981,817, mailed on Apr. 22, 2020, 5 pages.
Applicant Initiated Interview Summary received for U.S. Appl. No. 16/581,614, mailed on Apr. 30, 2020, 4 pages.
Applicant Initiated Interview Summary received for U.S. Appl. No. 16/581,614, mailed on Aug. 26, 2020, 3 pages.
Applicant Initiated Interview Summary received for U.S. Appl. No. 16/736,704, mailed on Aug. 27, 2020, 5 pages.
Applicant-Initiated Interview Summary received for U.S. Appl. No. 15/274,910, mailed on Jul. 9, 2020, 3 pages.
Applicant-Initiated Interview Summary received for U.S. Appl. No. 16/152, 139, mailed on Aug. 10, 2020, 3 pages.
Applicant-Initiated Interview Summary received for U.S. Appl. No. 16/428,875, mailed on Oct. 20, 2020, 6 pages.
Applicant-Initiated Interview Summary received for U.S. Appl. No. 16/581,569, mailed on May 1, 2020, 3 pages.
Applicant-Initiated Interview Summary received for U.S. Appl. No. 16/736,704, mailed on Dec. 11, 2020, 4 pages.
Certificate of Examination received for Australian Patent Application No. 2019100592, mailed on Feb. 6, 2020, 2 pages.
Certificate of Examination received for Australian Patent Application No. 2020100388, mailed on Sep. 28, 2020, 2 pages.
Decision to Grant received for Danish Patent Application No. PA201770503, mailed on Feb. 14, 2020, 2 pages.
Extended European Search Report received for European Patent Application No. 17835789.3, mailed on Jun. 23, 2020, 12 pages.
Final Office Action received for U.S. Appl. No. 15/274,910, mailed on May 31, 2019, 31 pages.
Final Office Action received for U.S. Appl. No. 15/274,910, mailed on Oct. 16, 2020, 34 pages.
Final Office Action received for U.S. Appl. No. 15/884,195, mailed on Sep. 29, 2020, 20 pages.
Final Office Action received for U.S. Appl. No. 16/152,139, mailed on Nov. 20, 2020, 9 pages.
Final Office Action received for U.S. Appl. No. 16/581,614, mailed on Jul. 10, 2020, 21 pages.
Final Office Action received for U.S. Appl. No. 16/736,704, mailed on Oct. 13, 2020, 62 pages.
Intention to Grant received for Danish Patent Application No. PA201770502, mailed on Oct. 6, 2020, 2 pages.
Intention to Grant received for Danish Patent Application No. PA201770503, mailed on Nov. 11, 2019, 2 pages.
International Preliminary Report on Patentability received for PCT Patent Application No. PCT/US2017/49500, mailed on Mar. 21, 2019, 14 pages.
International Preliminary Report on Patentability received for PCT Patent Application No. PCT/US2018/033054, mailed on Nov. 28, 2019, 21 pages.
International Search Report and Written Opinion received for PCT Patent Application No. PCT/US2018/033054, mailed on Oct. 30, 2018, 32 pages.
International Search Report and Written Opinion received for PCT Patent Application No. PCT/US2017/49500, mailed on Jan. 18, 2018, 18 pages.
International Search Report and Written Opinion received for PCT Patent Application No. PCT/US2019/024702, mailed on Sep. 13, 2019, 17 pages.
International Search Report and Written Opinion received for PCT Patent Application No. PCT/US2019/035064, mailed on Aug. 9, 2019, 12 pages.
International Search Report and Written Opinion received for PCT Patent Application No. PCT/US2020/020414, mailed on Jul. 27, 2020, 27 pages.
Invitation to Pay Additional Fee received for PCT Patent Application No. PCT/US2017/49500, mailed on Nov. 14, 2017, 3 pages.
Invitation to Pay Additional Fees received for PCT Patent Application No. PCT/US2018/033054, mailed on Sep. 4, 2018, 25 pages.
Invitation to Pay Additional Fees received for PCT Patent Application No. PCT/US2019/024702, mailed on Jul. 22, 2019, 11 pages.
Invitation to Pay Additional Fees received for PCT Patent Application No. PCT/US2020/020414, mailed on Jun. 4, 2020, 24 pages.
Invitation to Pay Search Fees received for European Patent Application No. 18730556.0, mailed on Mar. 2, 2020, 3 pages.
Non-Final Office Action received for U.S. Appl. No. 15/274,910, mailed on Oct. 18, 2018, 26 pages.
Non-Final Office Action received for U.S. Appl. No. 15/274,086, mailed on Jan. 11, 2017, 21 pages.
Non-Final Office Action received for U.S. Appl. No. 15/274,910, mailed on Apr. 6, 2020, 33 pages.
Non-Final Office Action received for U.S. Appl. No. 15/823,269, mailed on Jun. 23, 2020, 14 pages.
Non-Final Office Action received for U.S. Appl. No. 15/884,195, mailed on Feb. 27, 2020, 18 pages.
Non-Final Office Action received for U.S. Appl. No. 15/981,817, mailed on Jan. 2, 2020, 31 pages.
Non-Final Office Action received for U.S. Appl. No. 16/152,139, mailed on May 20, 2020, 9 pages.
Non-Final Office Action received for U.S. Appl. No. 16/428,875, mailed on Jul. 28, 2020, 30 pages.
Non-Final Office Action received for U.S. Appl. No. 16/581,569, mailed on Feb. 13, 2020, 32 pages.
Non-Final Office Action received for U.S. Appl. No. 16/581,614, mailed on Jan. 29, 2020, 13 pages.
Non-Final Office Action received for U.S. Appl. No. 16/736,704, mailed on May 1, 2020, 41 pages.
Nomad Studio, "Hajimete-no-smartphone-no-komatta-wo-sakutto-kaiketsu (Easy solution to troubles at your first smartphone)", Kazukuni Saito of Shuwa System Co., Ltd., 1st Ed, Jul. 1, 2016, 20 pages (Official Copy only) {See Communication under 37 CFR § 1.98(a) (3)}.

(56) References Cited

OTHER PUBLICATIONS

Notice of Acceptance received for Australian Patent Application No. 2018269512, mailed on Jan. 28, 2020, 3 pages.
Notice of Allowance received for Japanese Patent Application No. 2018-158482, mailed on Sep. 7, 2020, 4 pages (1 page of English Translation and 3 pages of Official Copy).
Notice of Allowance received for Japanese Patent Application No. 2018-504997, mailed on Aug. 3, 2018, 4 pages (1 page of English Translation and 3 pages of Official copy).
Notice of Allowance received for Korean Patent Application No. 10-2019-7033768, mailed on Jun. 3, 2020, 6 pages (2 pages of English Translation and 4 pages of Official Copy).
Notice of Allowance received for U.S. Appl. No. 15/274,086, mailed on Jun. 7, 2017, 8 pages.
Notice of Allowance received for U.S. Appl. No. 15/274,086, mailed on Oct. 19, 2017, 9 pages.
Notice of Allowance received for U.S. Appl. No. 15/823,269, mailed on Dec. 10, 2020, 10 pages.
Notice of Allowance received for U.S. Appl. No. 15/981,817, mailed on May 28, 2020, 16 pages.
Notice of Allowance received for U.S. Appl. No. 16/428,875, mailed on Dec. 2, 2020, 11 pages.
Notice of Allowance received for U.S. Appl. No. 16/581,569, mailed on May 27, 2020, 43 pages.
Office Action received for Australian Patent Application No. 2017324176, mailed on Apr. 21, 2020, 3 pages.
Office Action received for Australian Patent Application No. 2017324176, mailed on Aug. 17, 2020, 5 pages.
Office Action received for Australian Patent Application No. 2017324176, mailed on Feb. 27, 2020, 3 pages.
Office Action received for Australian Patent Application No. 2019100592, mailed on Aug. 21, 2019, 4 pages.
Office Action received for Australian Patent Application No. 2019100592, mailed on Nov. 25, 2019, 3 pages.
Office Action received for Australian Patent Application No. 2020100388, mailed on May 7, 2020, 5 pages.
Office Action received for Chinese Patent Application No. 201780002648.4, mailed on Dec. 5, 2018, 13 pages (5 pages of English Translation and 8 pages of Official Copy).
Office Action received for Chinese Patent Application No. 201780002648.4, mailed on Jun. 12, 2019, 11 pages (5 pages of English Translation and 6 pages of Official Copy).
Office Action received for Chinese Patent Application No. 201780002648.4, mailed on Nov. 26, 2019, 10 pages (4 pages of English Translation and 6 pages of Official Copy).
Office Action received for Danish Patent Application No. PA201770502, mailed on Dec. 14, 2018, 7 pages.
Office Action received for Danish Patent Application No. PA201770502, mailed on Jan. 20, 2020, 2 pages.
Office Action received for Danish Patent Application No. PA201770502, mailed on May 7, 2020, 5 pages.
Office Action received for Danish Patent Application No. PA201770502, mailed on Sep. 9, 2019, 2 pages.
Office Action received for Danish Patent Application No. PA201770503, mailed on Dec. 19, 2018, 6 pages.
Office Action received for Danish Patent Application No. PA201770503, mailed on Nov. 24, 2017, 10 pages.
Office Action received for Danish Patent Application No. PA201770503, mailed on Sep. 20, 2019, 5 pages.
Office Action received for Danish Patent Application No. PA201770505, mailed on Jan. 17, 2020, 7 pages.
Office Action received for Danish Patent Application No. PA201770505, mailed on Jul. 27, 2018, 4 pages.
Office Action received for Danish Patent Application No. PA201770505, mailed on May 20, 2019, 7 pages.
Office Action received for Danish Patent Application No. PA201770505, mailed on Sep. 19, 2017, 10 pages.
Office Action received for European Patent Application No. 18730556.0, mailed on Jun. 23, 2020, 11 pages.
Office Action received for Japanese Patent Application No. 2018-158482, mailed on Jan. 10, 2020, 9 pages (5 pages of English Translation and 4 pages of Official Copy).
Office Action received for Japanese Patent Application No. 2019-572834, mailed on Jul. 17, 2020, 13 pages (7 pages of English Translation and 6 pages of Official Copy).
Office Action received for Korean Patent Application No. 10-2019-7033768, mailed on Mar. 13, 2020, 6 pages (2 pages of English Translation and 4 pages of Official Copy).
Office Action received for Korean Patent Application No. 10-2020-7025711, mailed on Sep. 11, 2020, 12 pages (5 pages of English Translation and 7 pages of Official Copy).
Search Report and Opinion received for Danish Patent Application No. PA201770502, mailed on Nov. 10, 2017, 10 pages.
Teather et al., "Assessing the Effects of Orientation and Device on (Constrained) 3D Movement Techniques", IEEE Symposium on 3D User Interfaces. Reno, Nevada, USA., Mar. 8-9, 2008, 8 pages.
Notice of Acceptance received for Australian Patent Application No. 2020202953, mailed on Oct. 1, 2021, 3 pages.
Notice of Allowance received for U.S. Appl. No. 16/549,862, mailed on Oct. 20, 2021, 7 pages.
Office Action received for Chinese Patent Application No. 202011206499.3, mailed on Sep. 28, 2021, 7 pages (4 pages of English Translation and 3 pages of Official Copy).
Notice of Allowance received for U.S. Appl. No. 15/823,269, mailed on Mar. 31, 2021, 9 pages.
Office Action received for European Patent Application No. 20204436.8, mailed on Mar. 22, 2021, 10 pages.
Applicant-Initiated Interview Summary received for U.S. Appl. No. 17/037,085, mailed on Sep. 27, 2021, 4 pages.
International Preliminary Report on Patentability received for PCT Patent Application No. PCT/US2020/020414, mailed on Oct. 7, 2021, 18 pages.
Notice of Acceptance received for Australian Patent Application No. 2019281961, mailed on Sep. 27, 2021, 3 pages.
Office Action received for Korean Patent Application No. 10-2019-7006639, mailed on Sep. 16, 2021, 20 pages (10 pages of English Translation and 10 pages of Official Copy).
Office Action received for Australian Patent Application No. 2020202953, mailed on Mar. 29, 2021, 4 pages.
Office Action received for European Patent Application No. 17835789.3, mailed on Jan. 20, 2021, 14 pages.
Office Action received for Japanese Patent Application No. 2019-572834, mailed on Dec. 4, 2020, 7 pages (3 pages of English Translation and 4 pages of Official Copy).
Advisory Action received for U.S. Appl. No. 16/581,614, mailed on Nov. 4, 2021, 4 pages.
Notice of Allowance received for Chinese Patent Application No. 202010174749.3, mailed on Oct. 28, 2021, 4 pages (3 pages of English Translation and 1 page of Official Copy).
Notice of Allowance received for Japanese Patent Application No. 2019-572834, mailed on Nov. 1, 2021, 5 pages (1 page of English Translation and 4 pages of Official Copy).
Notice of Allowance received for U.S. Appl. No. 15/884,195, mailed on Nov. 17, 2021, 19 pages.
Notice of Allowance received for U.S. Appl. No. 17/037,085, mailed on Nov. 10, 2021, 10 pages.
Non-Final Office Action received for U.S. Appl. No. 16/581,614, mailed on Feb. 4, 2021, 18 pages.
Notice of Allowance received for Korean Patent Application No. 10-2020-7025711, mailed on Jan. 19, 2021, 6 pages (2 pages of English Translation and 4 pages of Official Copy).
Office Action received for Australian Patent Application No. 2017324176, mailed on Jan. 14, 2021, 6 pages.
"Use NFC with Screen Off or in Lock Screen on Galaxy Nexus", Available online at: https://www.xda-developers.com/use-nfc-with-screen-off-or-in-lock-screen-on-galaxy-nexus/, Jun. 14, 2012, 4 pages.
Non-Final Office Action received for U.S. Appl. No. 15/274,910, mailed on Dec. 24, 2021, 35 pages.
Office Action received for Korean Patent Application No. 10-2020-7034424, mailed on Dec. 3, 2021, 13 pages (6 pages of English Translation and 7 pages of Official Copy).

(56) References Cited

OTHER PUBLICATIONS

Supplemental Notice of Allowance received for U.S. Appl. No. 15/884,195, mailed on Dec. 16, 2021, 3 pages.
Applicant-Initiated Interview Summary received for U.S. Appl. No. 16/549,862, mailed on May 21, 2021, 2 pages.
Notice of Allowance received for U.S. Appl. No. 15/823,269, mailed on Jun. 3, 2021, 6 pages.
Notice of Allowance received for U.S. Appl. No. 16/152,139, mailed on May 26, 2021, 7 pages.
Office Action received for Australian Patent Application No. 2019281961, mailed on Jun. 16, 2021, 2 pages.
Office Action received for Chinese Patent Application No. 202011206499.3, mailed on May 21, 2021, 20 pages (10 pages of English Translation and 10 pages of Official Copy).
Office Action received for Japanese Patent Application No. 2019-572834, mailed on Jun. 7, 2021, 5 pages (2 pages of English Translation and 3 pages of Official Copy).
Office Action received for Korean Patent Application No. 10-2019-7006639, mailed on Jun. 15, 2021, 8 pages (4 pages of English Translation and 4 pages of Official Copy).
Corrected Notice of Allowance received for U.S. Appl. No. 16/549,862, mailed on Dec. 2, 2021, 2 pages.
Non-Final Office Action received for U.S. Appl. No. 17/037,085, mailed on Jul. 8, 2021, 37 pages.
Office Action received for Chinese Patent Application No. 202010174749.3, mailed on June 2, 2021, 19 pages (10 pages of English Translation and 9 pages of Official Copy).

\* cited by examiner
† cited by third party

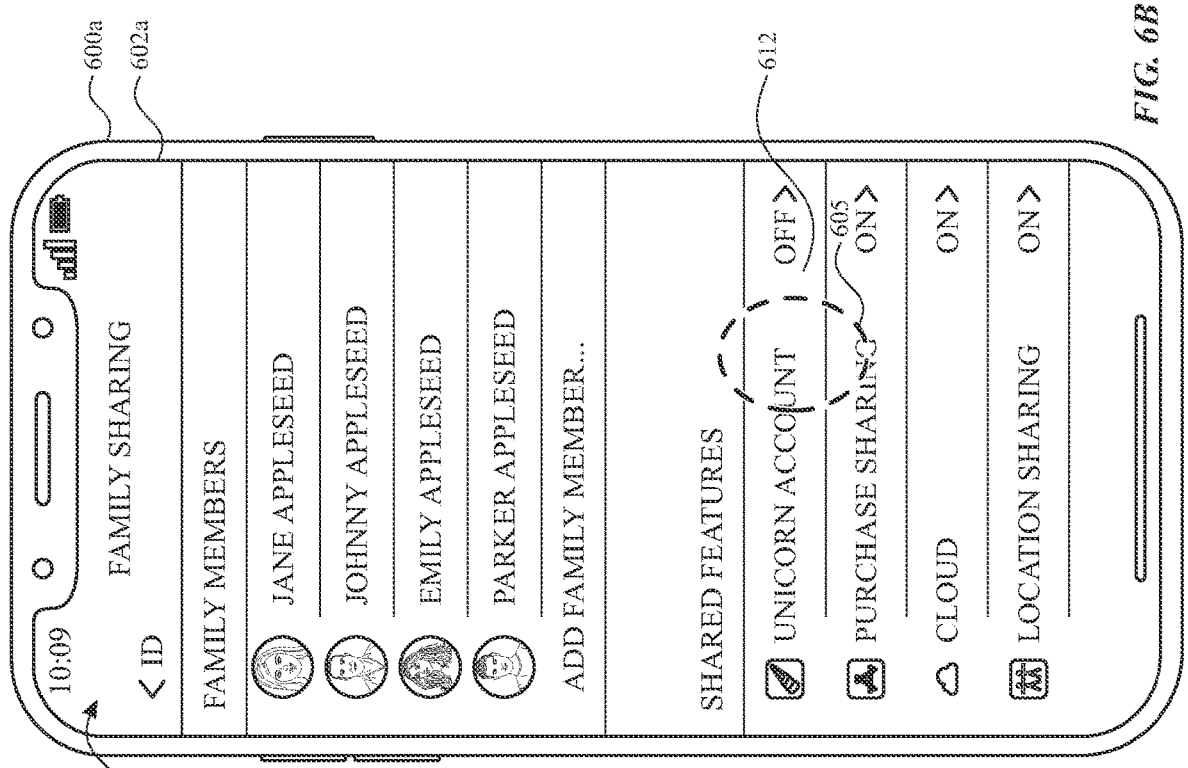
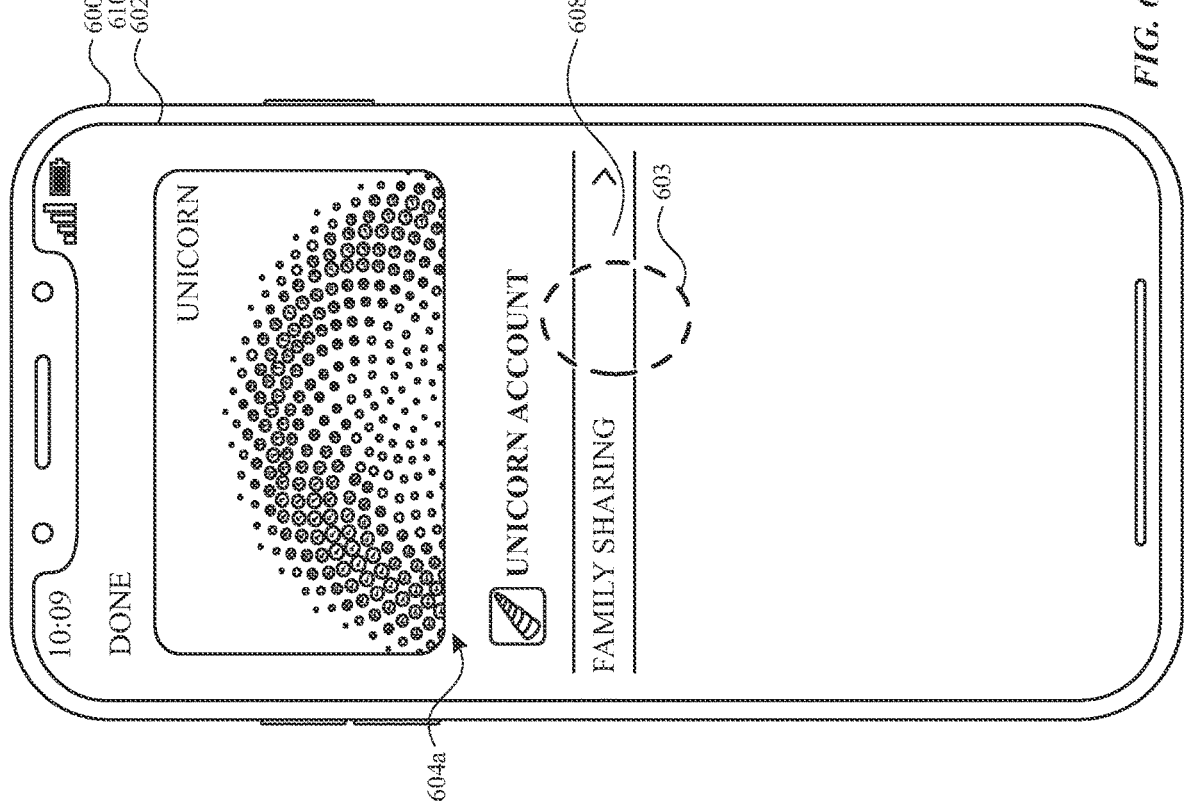

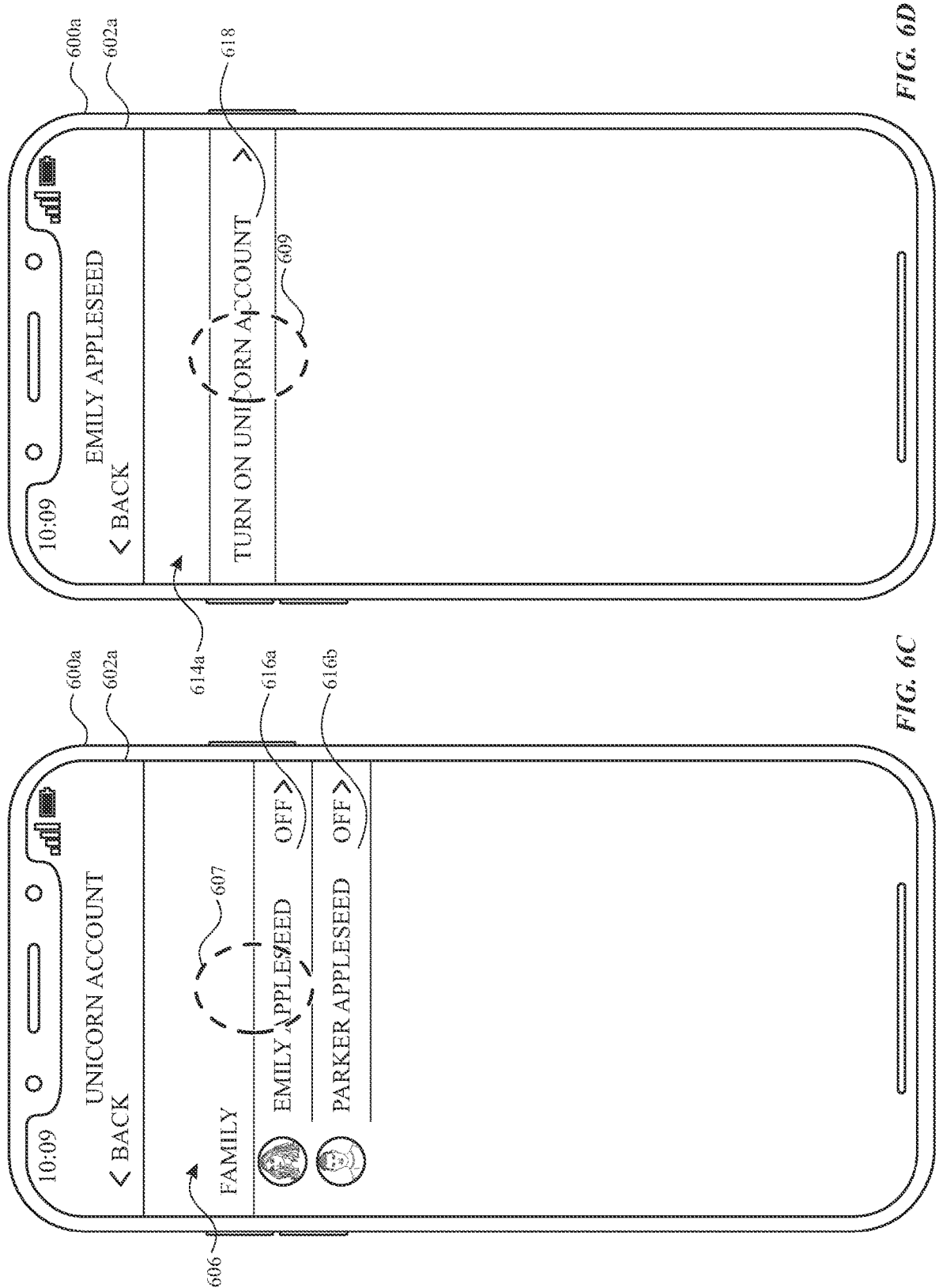

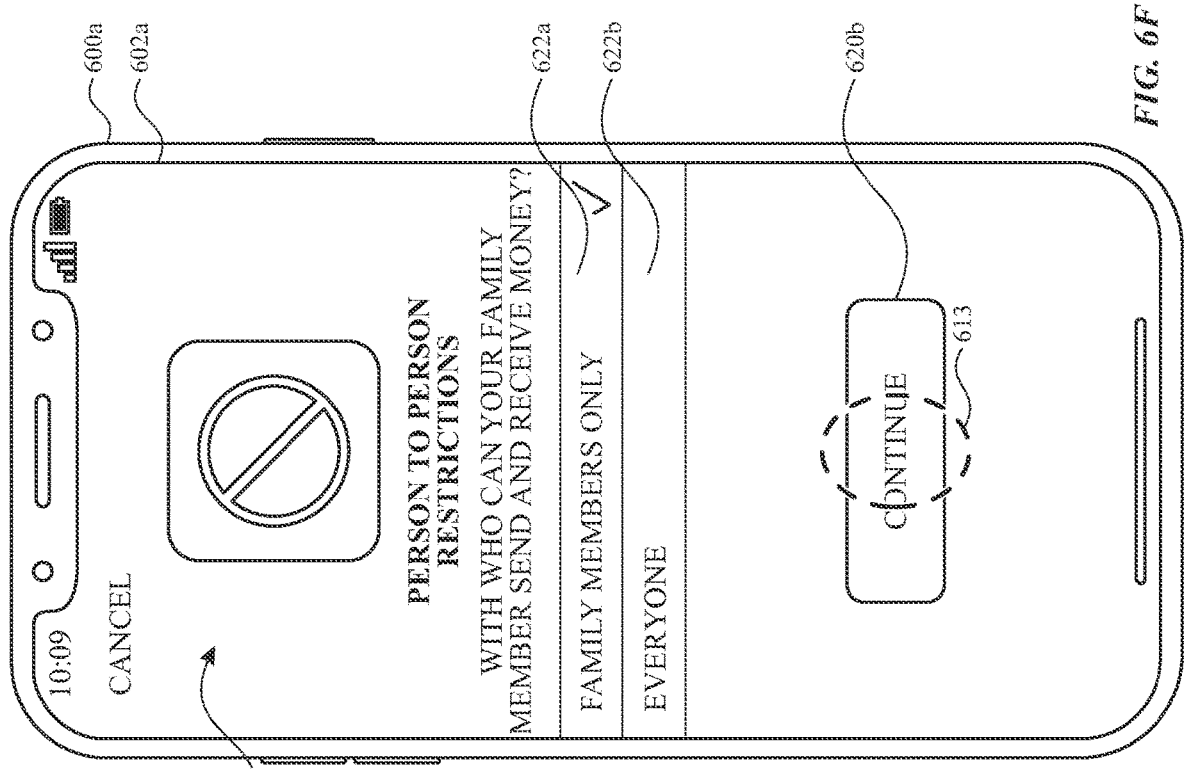
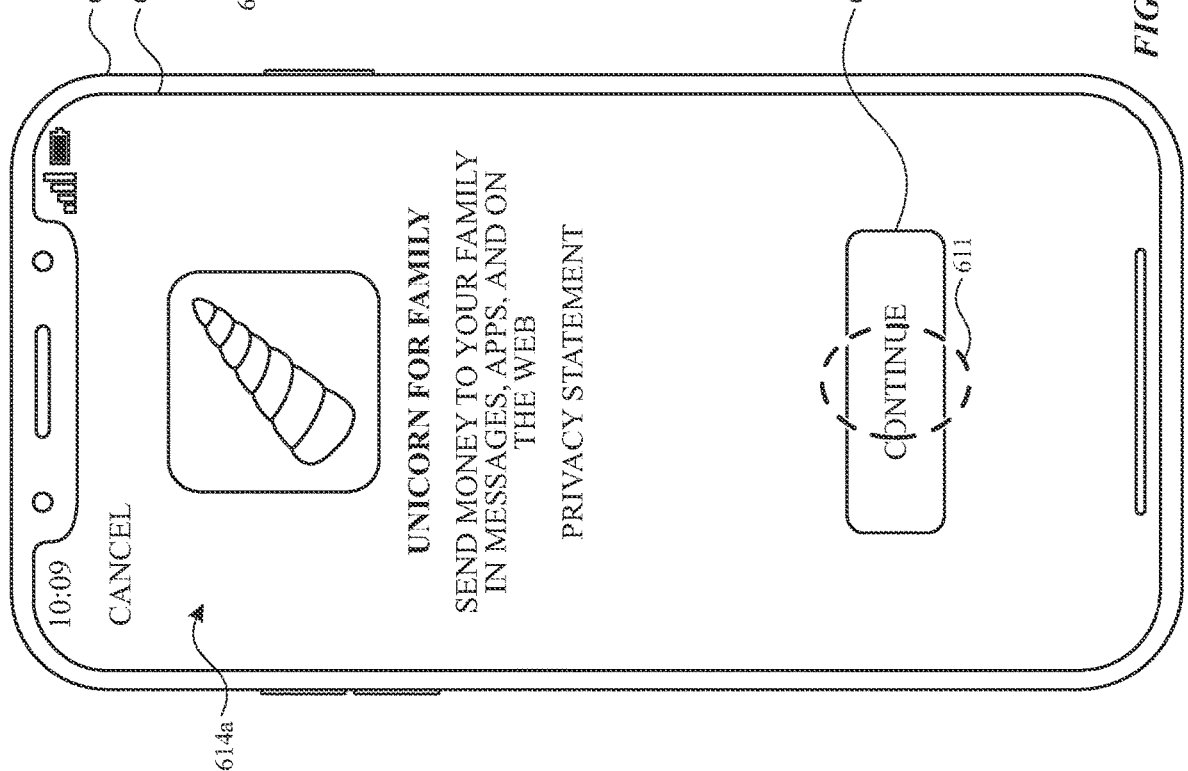

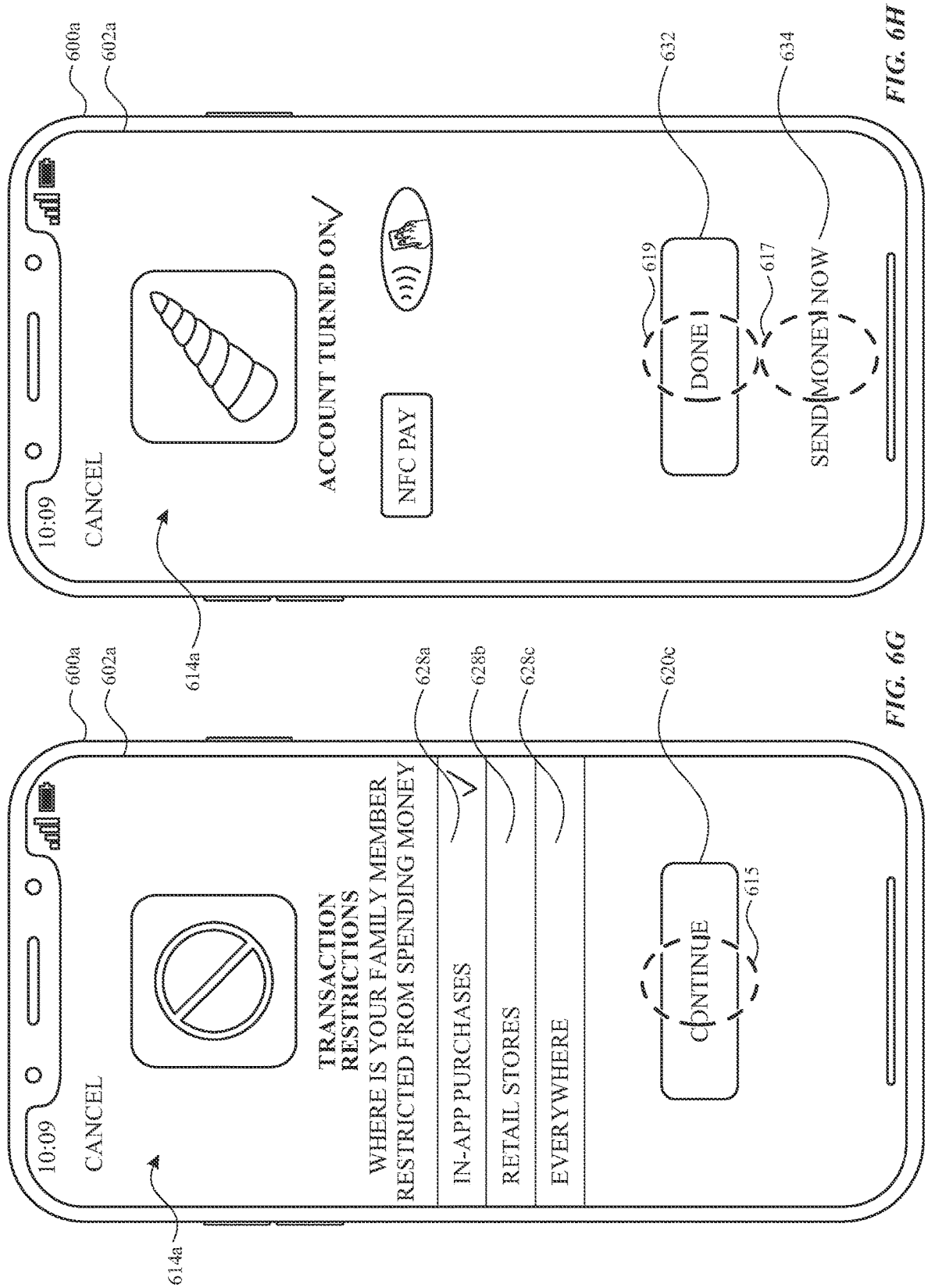

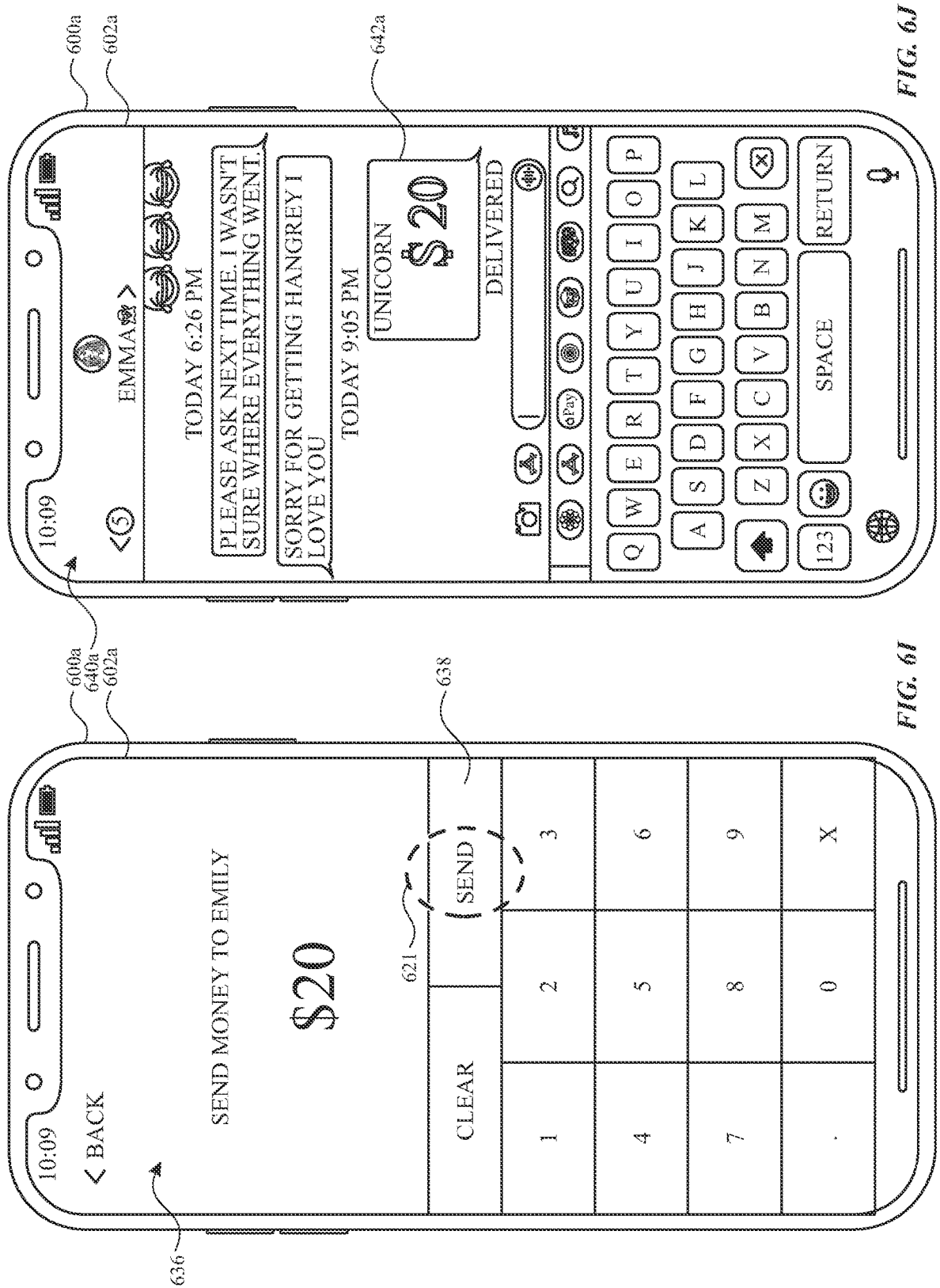

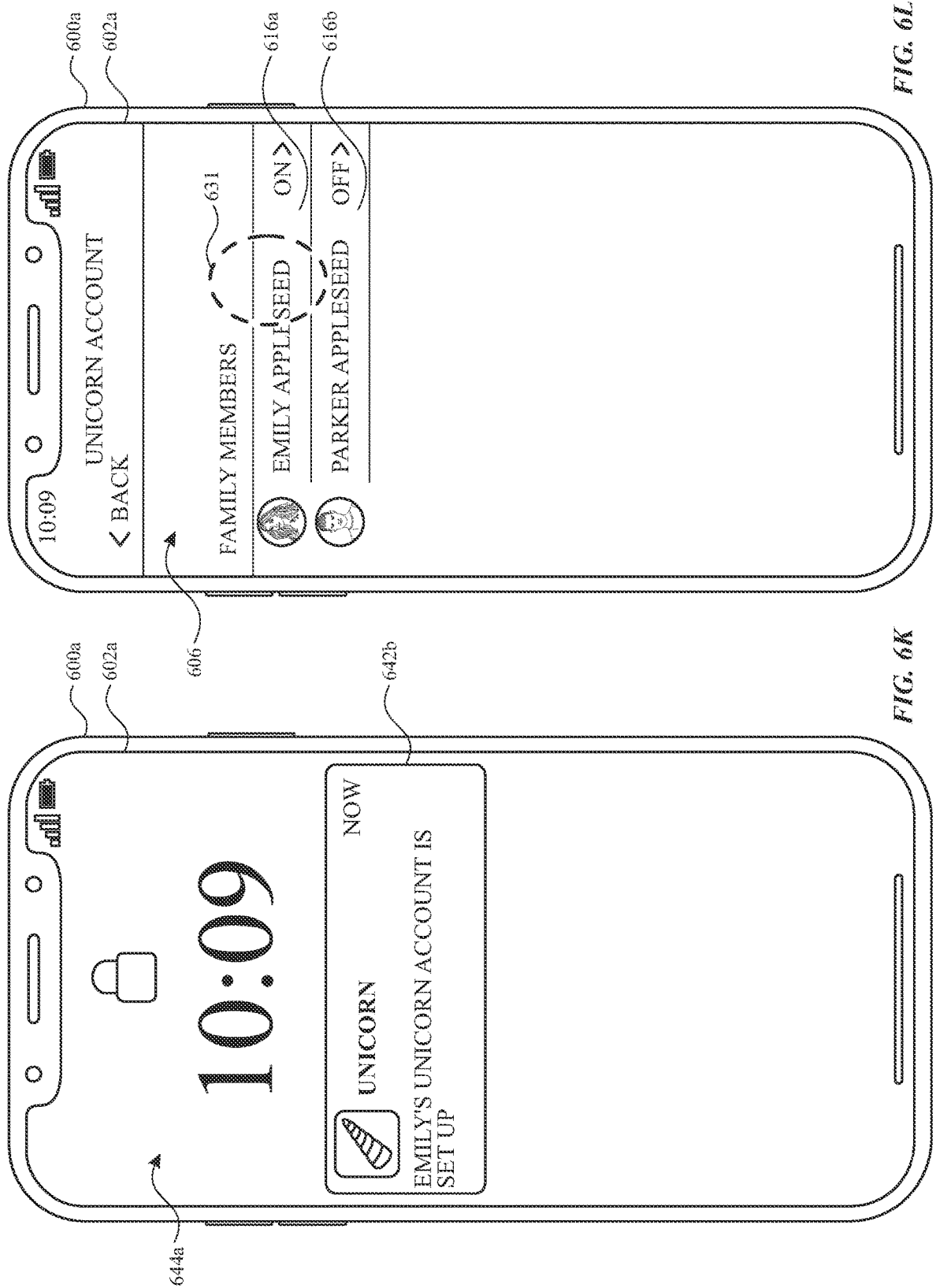

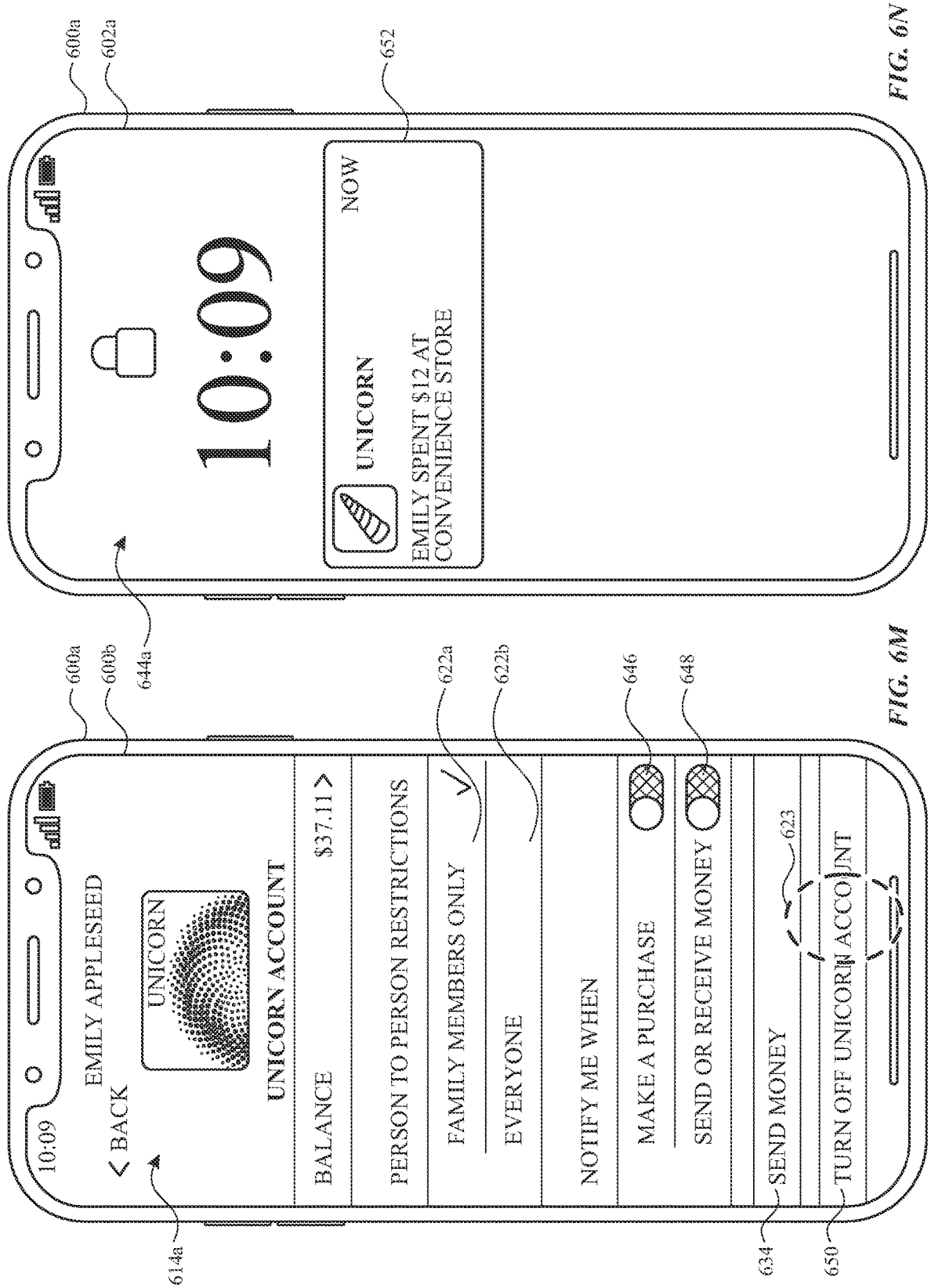

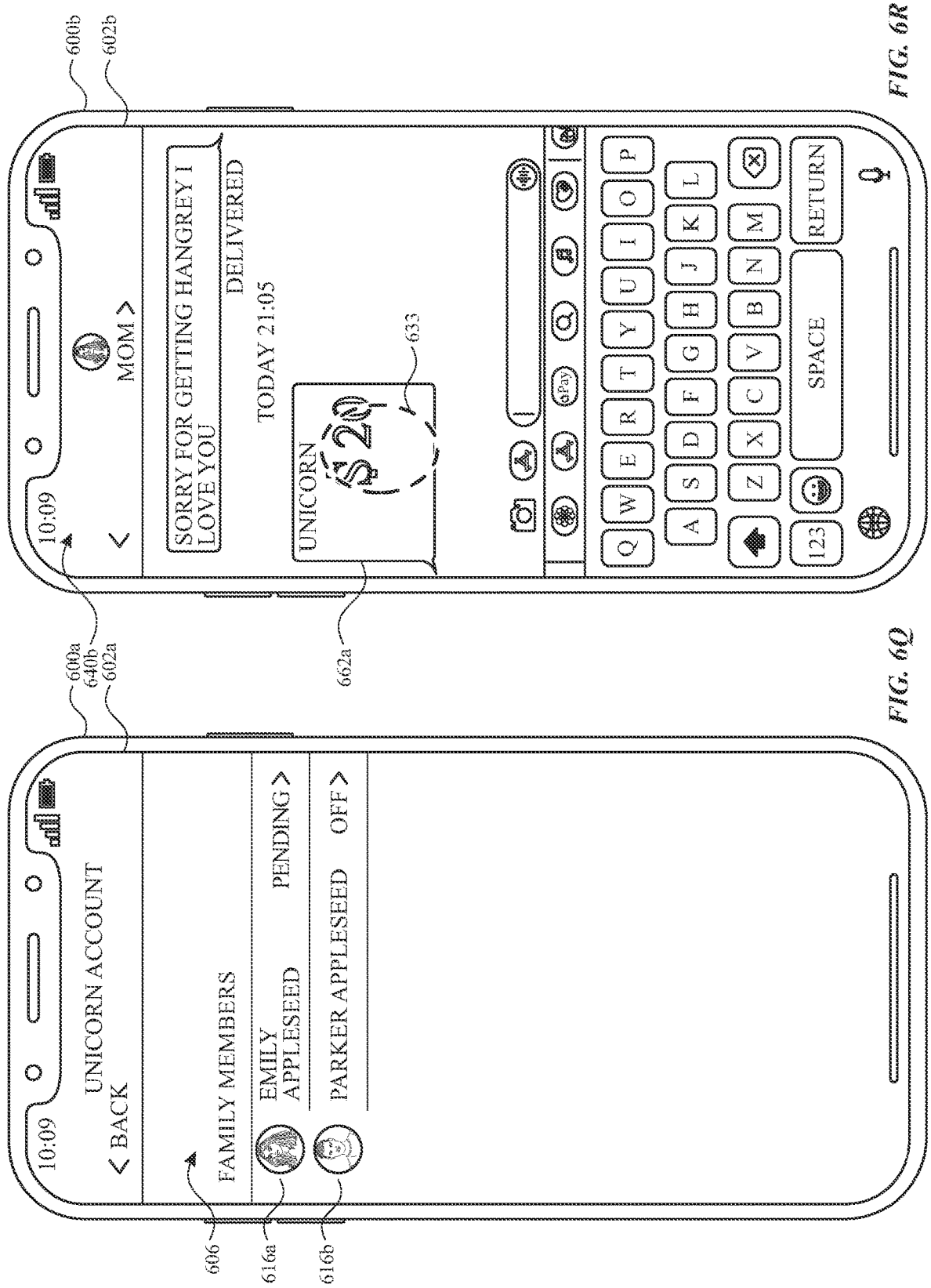

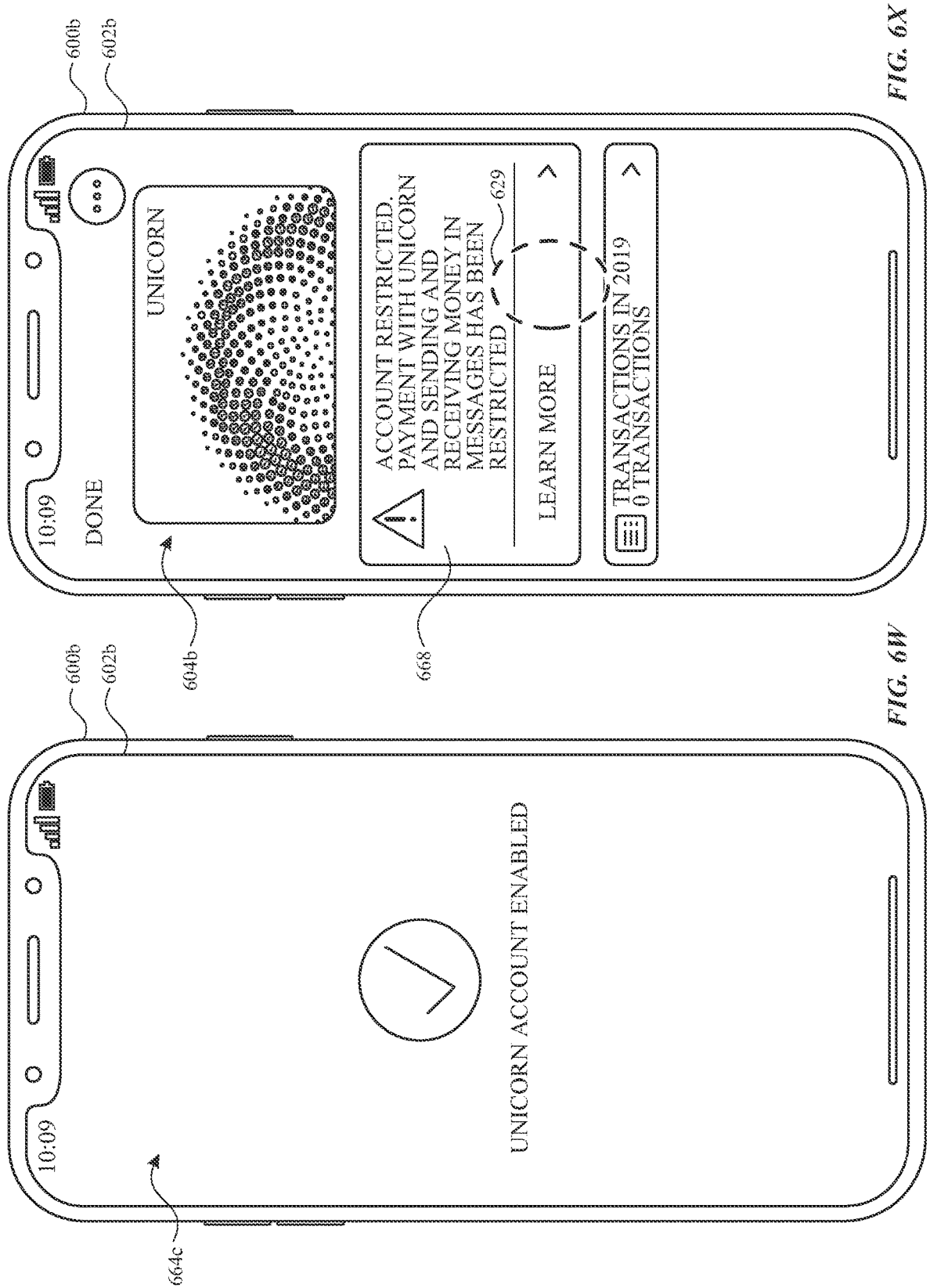

700 ↘

702
Display user interface for configuring an account for use by one or more devices associated with a second user identity, the user interface including a control for selecting between:

704
A first account option that, when selected, indicates that transfers are permitted between the account and only a first set of user accounts, where the first set of user accounts are associated with a predetermined set of users of the service

706
A second account option that, when selected, indicates that transfers are permitted between the account and a second set of user accounts, where the second set of user accounts includes the first set of user accounts and one or more additional user accounts associated with additional users of the service

↓

708
In response to detecting an input corresponding to a request to configure the account:

710
In accordance with a determination that the first account option is currently selected, transmit a request to configure the account with an account setting corresponding to the first account option

712
In accordance with a determination that the second account option is currently selected, transmit a request to configure the account with an account setting corresponding to the second account option

*FIG. 7*

CONFIGURING AN ACCOUNT FOR A SECOND USER IDENTITY

CROSS-REFERENCE TO RELATED APPLICATIONS

This application claims priority to U.S. Provisional Patent Application Ser. No. 63/032,399, entitled "CONFIGURING AN ACCOUNT FOR A SECOND USER IDENTITY," filed May 29, 2020, the contents of which are hereby incorporated by reference in their entirety.

FIELD

The present disclosure relates generally to computer user interfaces, and more specifically to techniques for configuring an account.

BACKGROUND

A computer system can be used to configure various aspects of an account provisioned on the computer system. Typically, the account is associated with a user of the computer system.

BRIEF SUMMARY

Some techniques for configuring an account using a computer system, however, are generally cumbersome and inefficient. For example, some existing techniques provide limited options for configuring an account for a second user identity. In addition, some existing techniques for configuring an account require more time than necessary, wasting user time and device energy. This latter consideration is particularly important in battery-operated devices.

Accordingly, the present technique provides computer systems with faster, more efficient methods and interfaces for configuring an account for a second user identity. Such methods and interfaces optionally complement or replace other methods for configuring an account. Such methods and interfaces reduce the cognitive burden on a user and produce a more efficient human-machine interface. For battery-operated computer systems, such methods and interfaces conserve power and increase the time between battery charges.

Example methods are disclosed herein. An example method includes, at a computer system that is associated with a first user identity, the computer system having a display generation component and one or more input devices: displaying, via the display generation component, a user interface for configuring an account for use by one or more devices associated with a second user identity, the user interface including a control for selecting between: a first account option that, when selected, indicates that transfers are permitted between the account and only a first set of user accounts, the first set of user accounts are associated with a predetermined set of users of the service; a second account option that, when selected, indicates that transfers are permitted between the account and a second set of user accounts, the second set of user accounts includes the first set of user accounts and one or more additional user accounts associated with additional users of the service; and in response to detecting, via the one or more input devices, an input corresponding to a request to configure the account: in accordance with a determination that the first account option is currently selected, transmitting a request to configure the account with an account setting corresponding to the first account option; and in accordance with a determination that the second account option is currently selected, transmitting a request to configure the account with an account setting corresponding to the second account option.

Example non-transitory computer-readable storage media are described herein. An example non-transitory computer-readable storage medium stores one or more programs configured to be executed by one or more processors of a computer system that is associated with a first user identity, the computer system having a display generation component and one or more input devices, the one or more programs including instructions for: displaying, via the display generation component, a user interface for configuring an account for use by one or more devices associated with a second user identity, the user interface including a control for selecting between: a first account option that, when selected, indicates that transfers are permitted between the account and only a first set of user accounts, the first set of user accounts are associated with a predetermined set of users of the service; a second account option that, when selected, indicates that transfers are permitted between the account and a second set of user accounts, the second set of user accounts includes the first set of user accounts and one or more additional user accounts associated with additional users of the service; and in response to detecting, via the one or more input devices, an input corresponding to a request to configure the account: in accordance with a determination that the first account option is currently selected, transmitting a request to configure the account with an account setting corresponding to the first account option; and in accordance with a determination that the second account option is currently selected, transmitting a request to configure the account with an account setting corresponding to the second account option.

Example transitory computer-readable storage media are described herein. An example transitory computer-readable storage medium stores one or more programs configured to be executed by one or more processors of a computer system that is associated with a first user identity, the computer system having a display generation component and one or more input devices, the one or more programs including instructions for: displaying, via the display generation component, a user interface for configuring an account for use by one or more devices associated with a second user identity, the user interface including a control for selecting between: a first account option that, when selected, indicates that transfers are permitted between the account and only a first set of user accounts, the first set of user accounts are associated with a predetermined set of users of the service; a second account option that, when selected, indicates that transfers are permitted between the account and a second set of user accounts, the second set of user accounts includes the first set of user accounts and one or more additional user accounts associated with additional users of the service; and in response to detecting, via the one or more input devices, an input corresponding to a request to configure the account: in accordance with a determination that the first account option is currently selected, transmitting a request to configure the account with an account setting corresponding to the first account option; and in accordance with a determination that the second account option is currently selected, transmitting a request to configure the account with an account setting corresponding to the second account option.

Example computer systems are described herein. An example computer system is associated with a first user identity and includes a display generation component; one or more input devices; one or more processors; and memory storing one or more programs configured to be executed by the one or more processors, the one or more programs including instructions for: displaying, via the display generation component, a user interface for configuring an account for use by one or more devices associated with a second user identity, the user interface including a control for selecting between: a first account option that, when selected, indicates that transfers are permitted between the account and only a first set of user accounts, the first set of user accounts are associated with a predetermined set of users of the service; a second account option that, when selected, indicates that transfers are permitted between the account and a second set of user accounts, the second set of user accounts includes the first set of user accounts and one or more additional user accounts associated with additional users of the service; and in response to detecting, via the one or more input devices, an input corresponding to a request to configure the account: in accordance with a determination that the first account option is currently selected, transmitting a request to configure the account with an account setting corresponding to the first account option; and in accordance with a determination that the second account option is currently selected, transmitting a request to configure the account with an account setting corresponding to the second account option.

An example computer system associated with a first user identity includes a display generation component; one or more input devices; means for displaying, via the display generation component, a user interface for configuring an account for use by one or more devices associated with a second user identity, the user interface including a control for selecting between: a first account option that, when selected, indicates that transfers are permitted between the account and only a first set of user accounts, the first set of user accounts are associated with a predetermined set of users of the service; a second account option that, when selected, indicates that transfers are permitted between the account and a second set of user accounts, the second set of user accounts includes the first set of user accounts and one or more additional user accounts associated with additional users of the service; and means for, in response to detecting, via the one or more input devices, an input corresponding to a request to configure the account: in accordance with a determination that the first account option is currently selected, transmitting a request to configure the account with an account setting corresponding to the first account option; and in accordance with a determination that the second account option is currently selected, transmitting a request to configure the account with an account setting corresponding to the second account option.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, computer systems are provided with faster, more efficient methods and interfaces for configuring an account for a second user identity, thereby increasing the effectiveness, efficiency, and user satisfaction with such devices. Such methods and interfaces may complement or replace other methods for configuring an account.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 7 is a flow diagrams illustrating a method for configuring an account using a computer system in accordance with some embodiments.

DESCRIPTION OF EMBODIMENTS

Figure 1A:
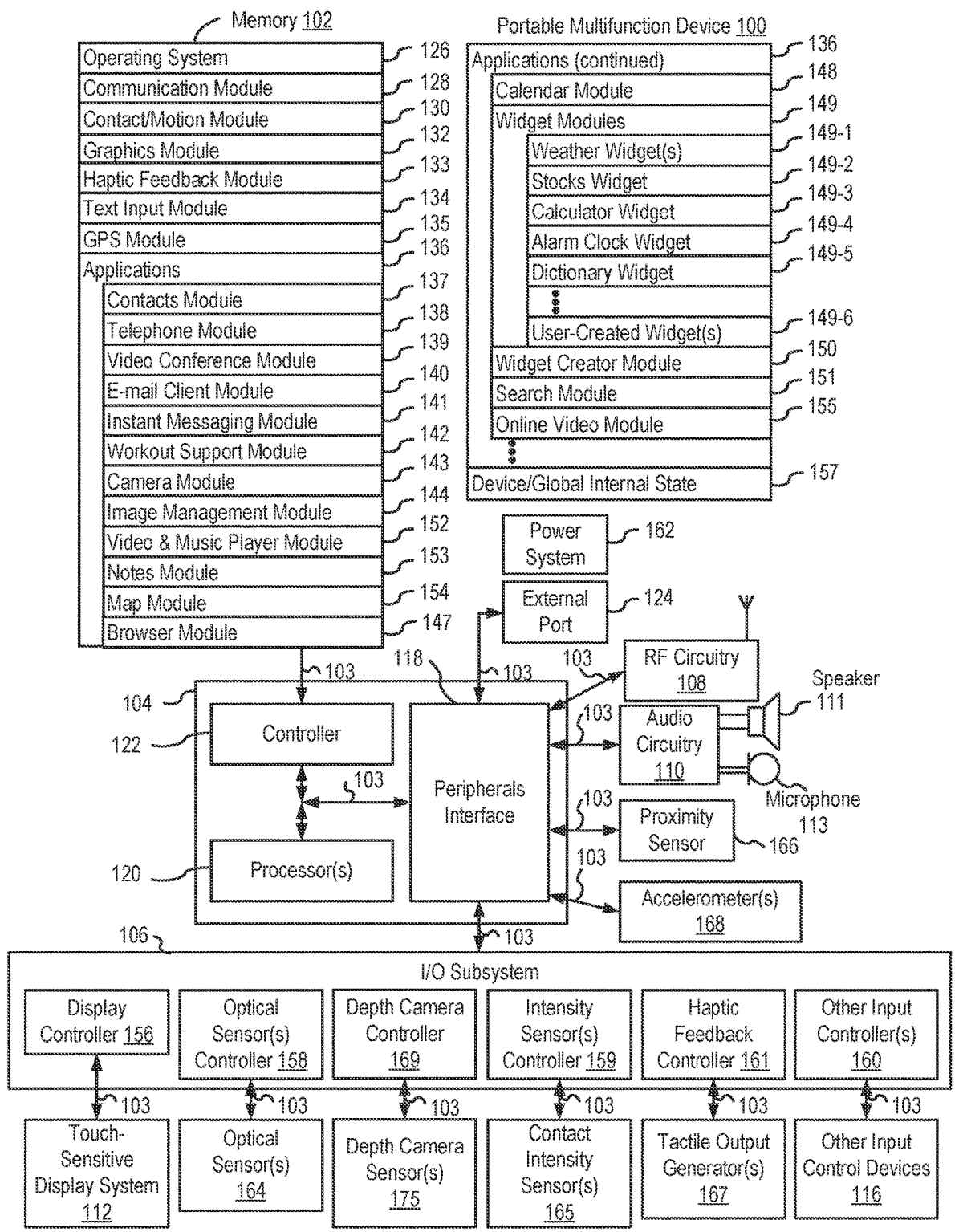
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for configuring an account for a second user identity. For example, there is a need for a parent to configure an account for a child, where the parent can restrict the child's account to certain uses. Such techniques can reduce the cognitive burden on a user who is configuring the account, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for configuring an account. FIGS. 6A-6Y illustrate exemplary user interfaces for configuring an account. FIG. 7 is a flow diagram illustrating methods of configuring an account in accordance with some embodiments. The user interfaces in FIGS. 6A-6Y are used to illustrate the processes described below, including the processes in FIG. 7.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
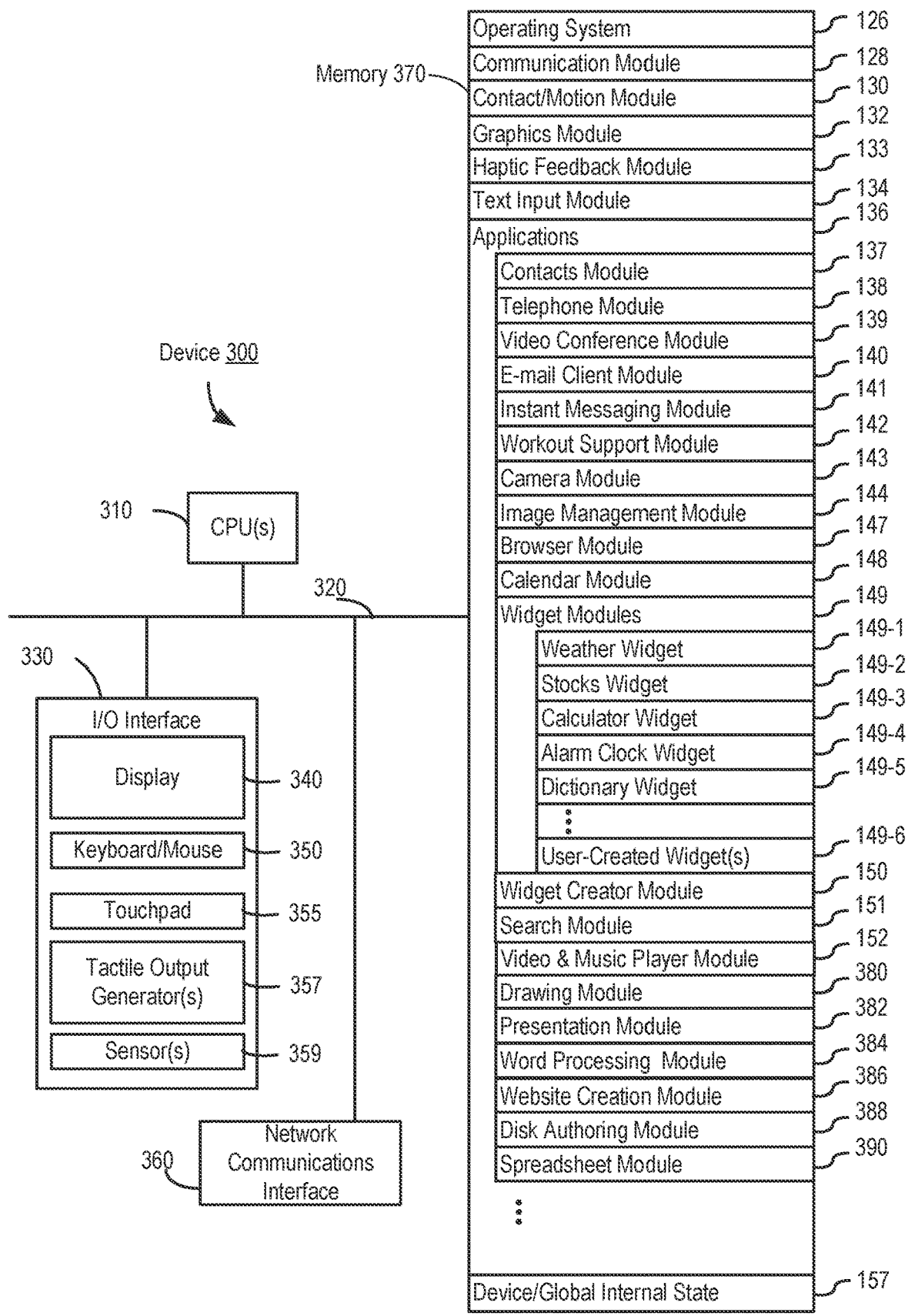
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
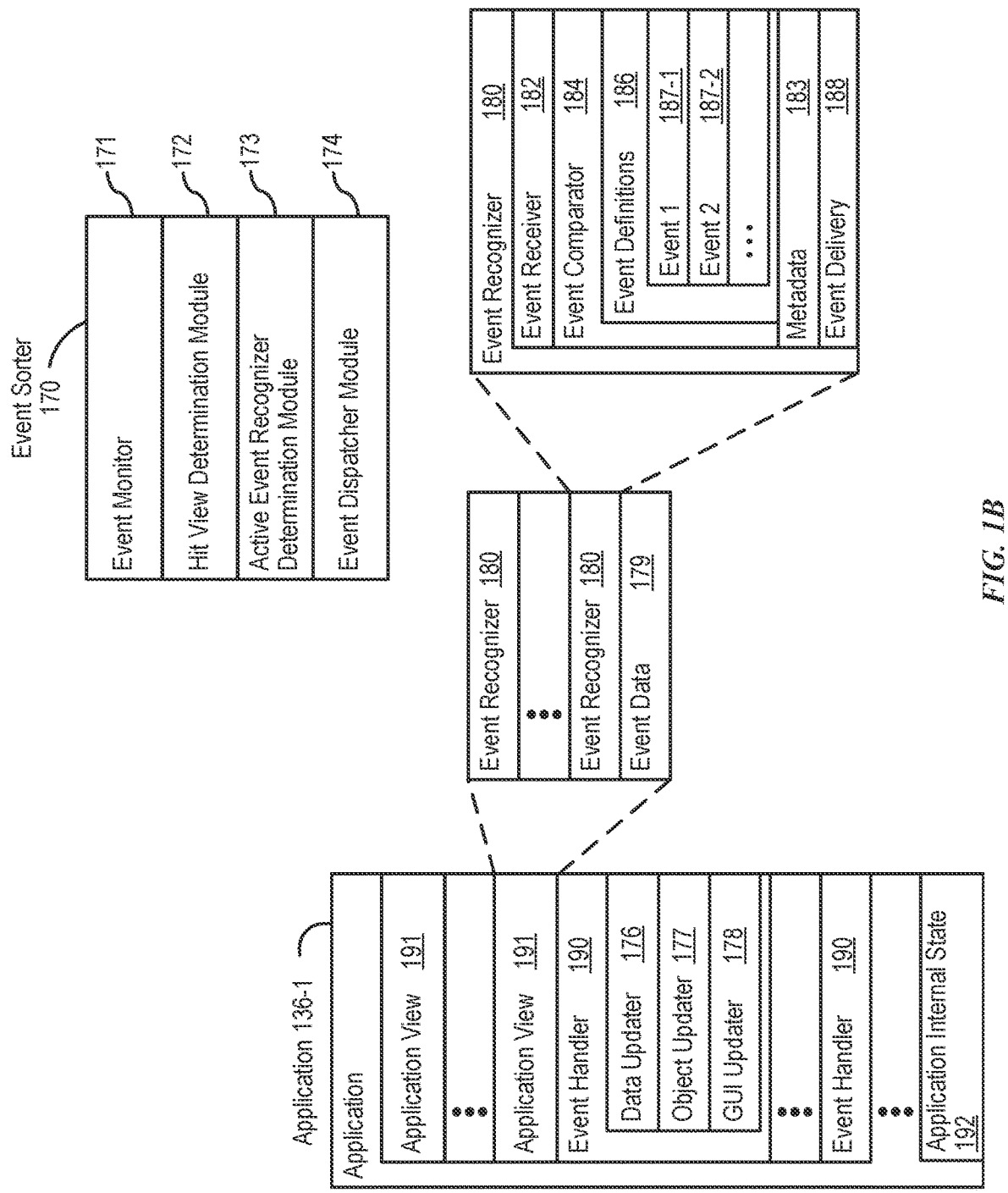
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
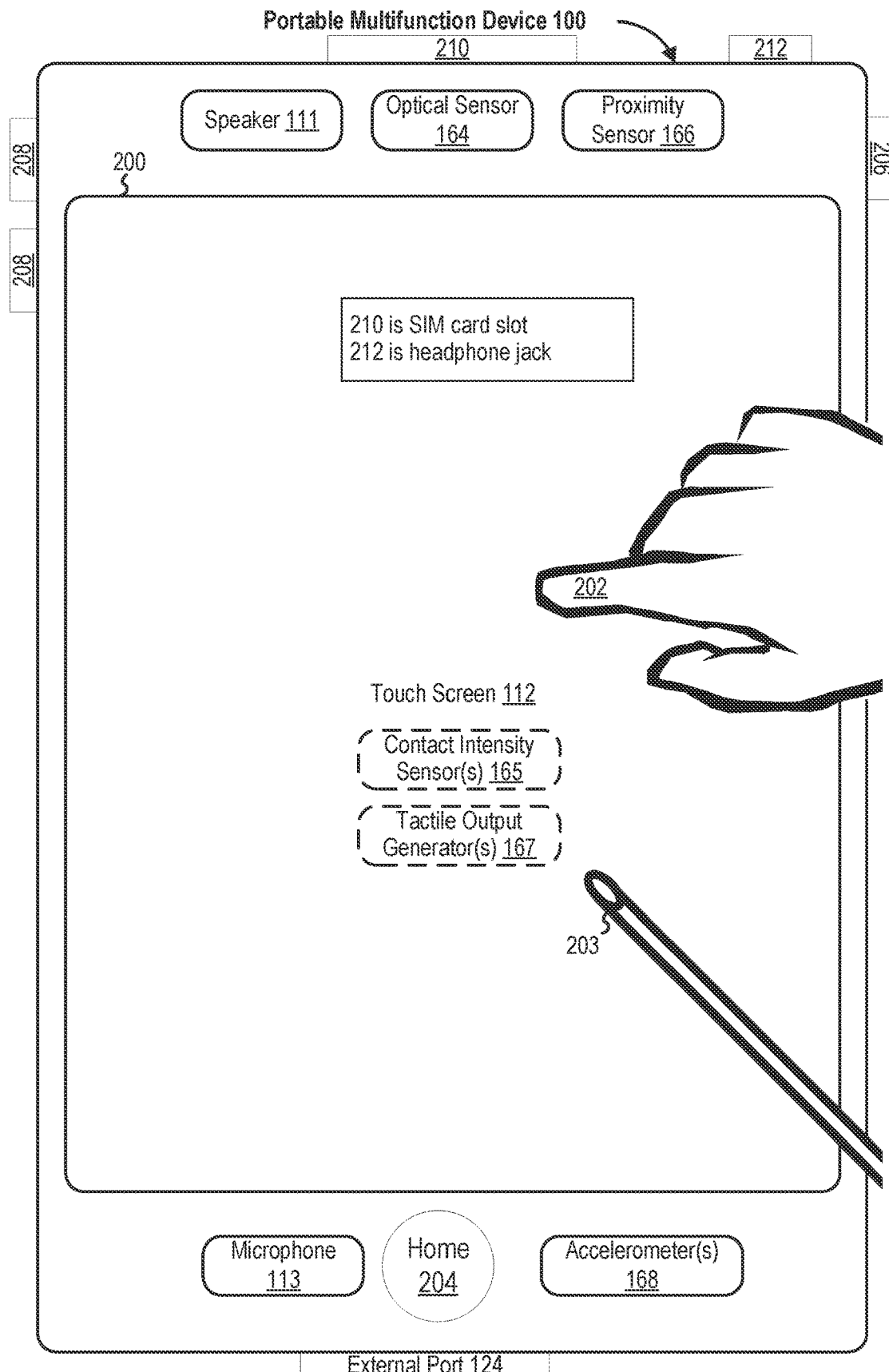
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
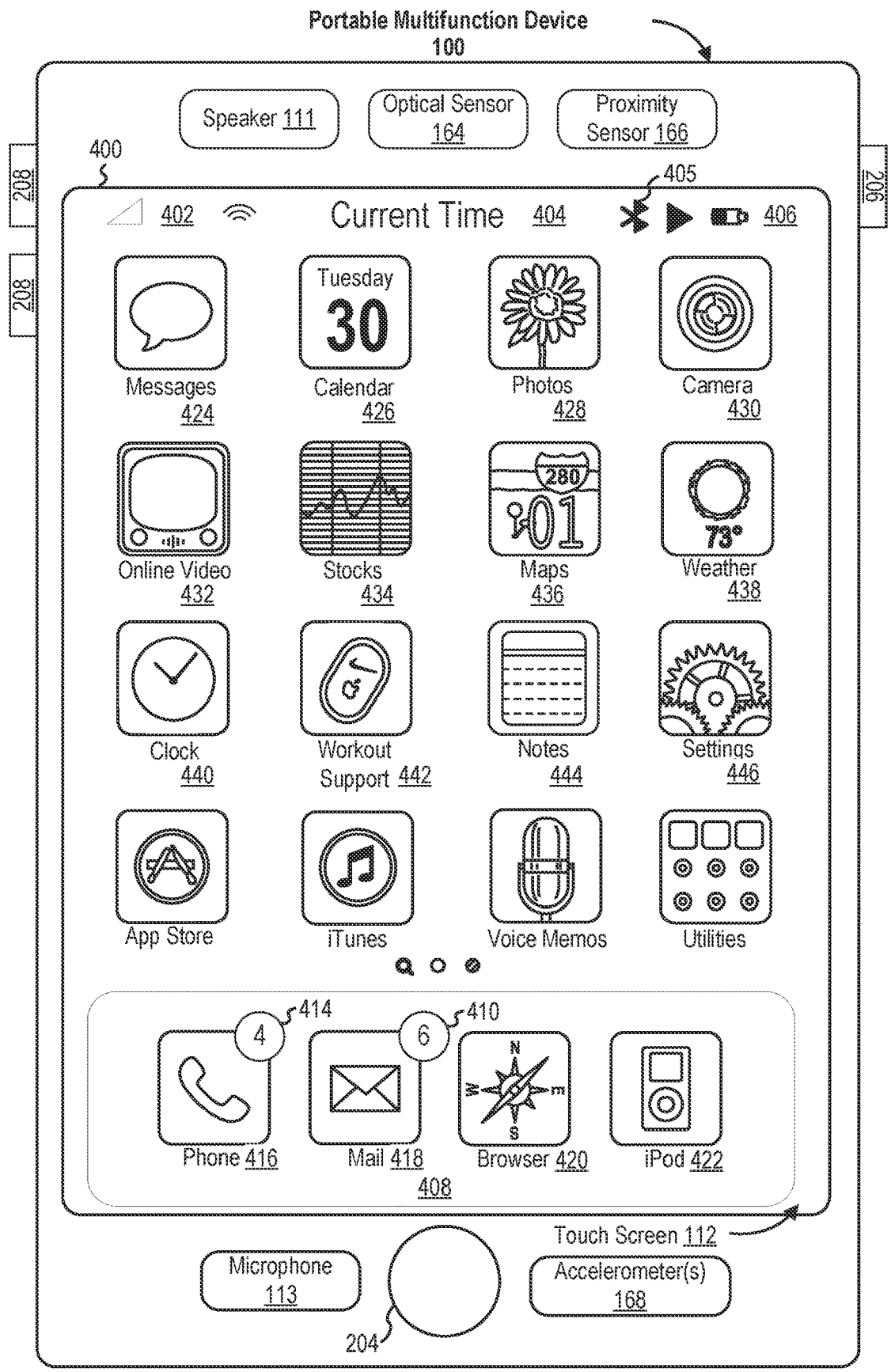
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
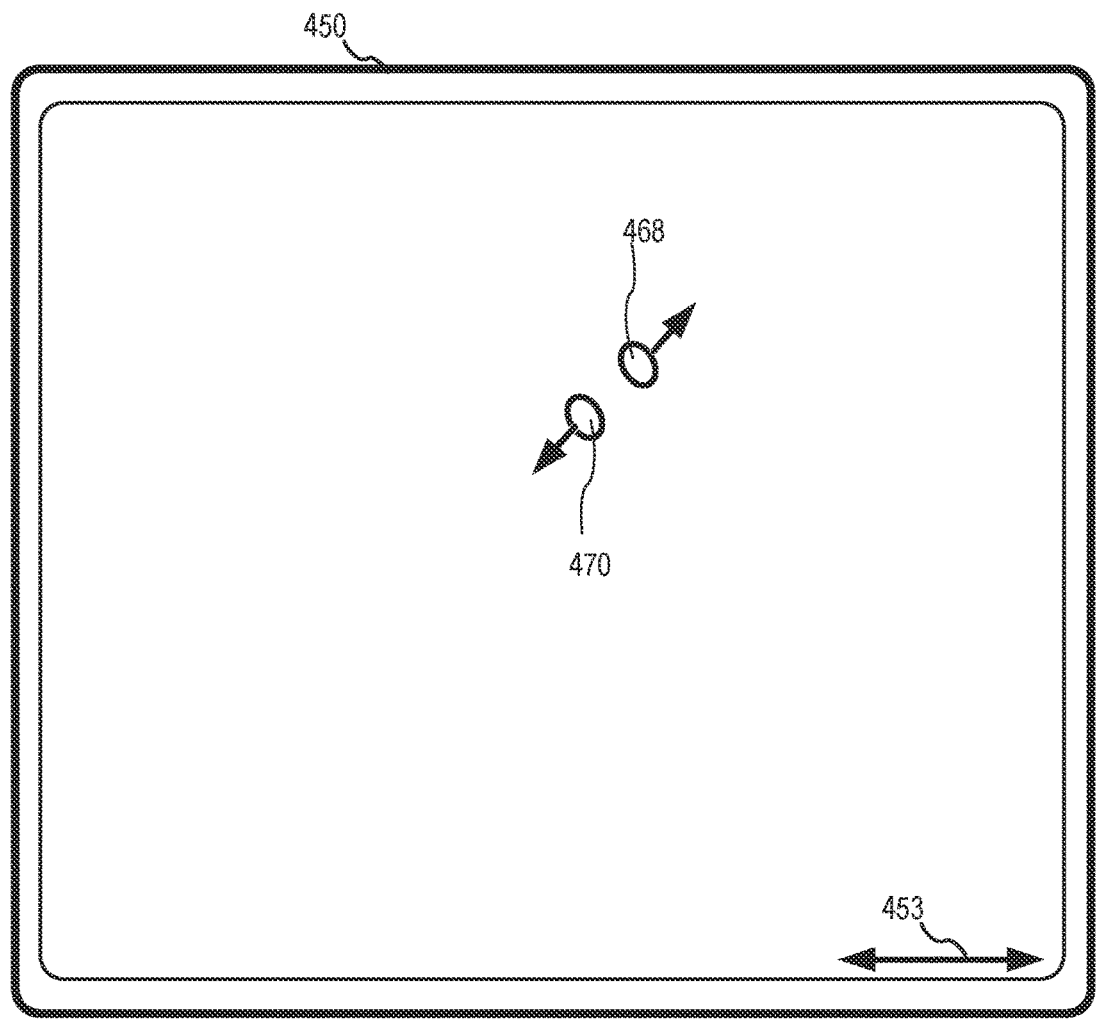
FIG. 4B illustrates an exemplary user interface for a multifunction device with a touch-sensitive surface that is separate from the display in accordance with some embodiments.
Figure 4B:
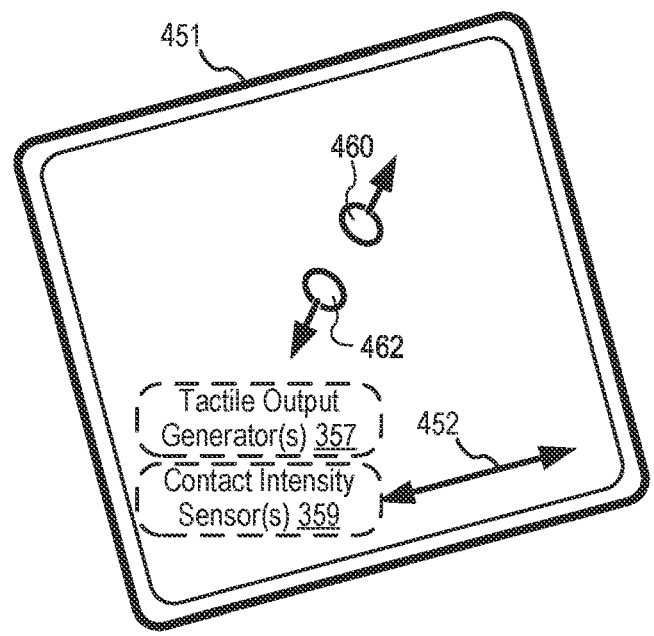

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
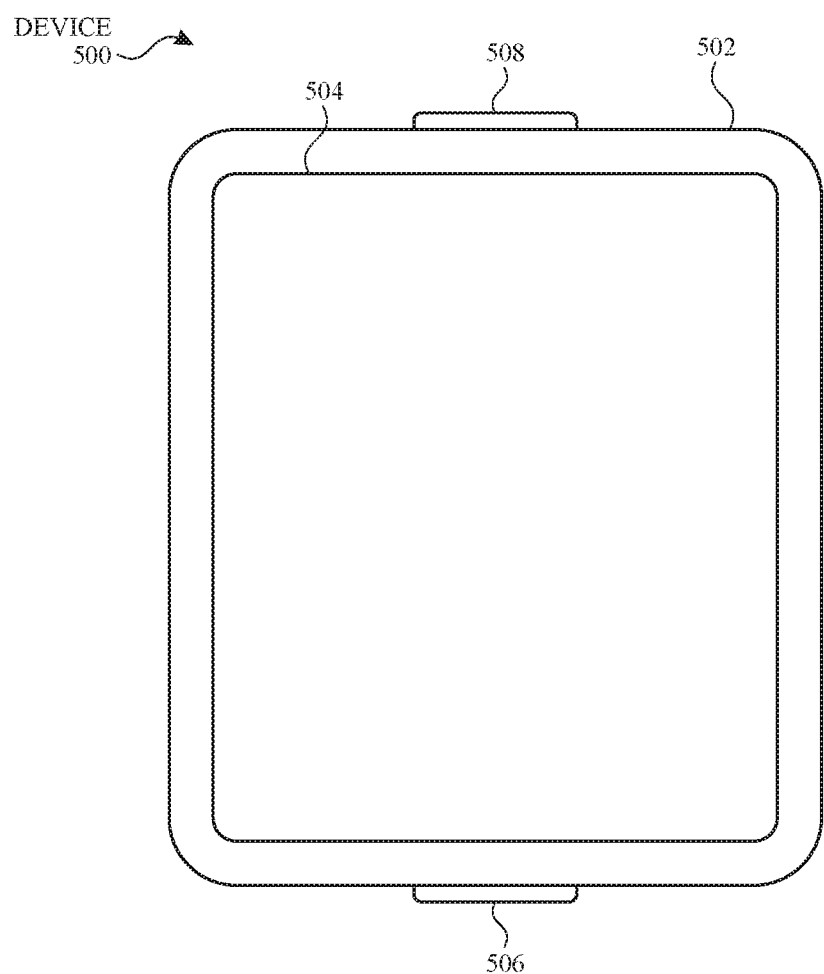
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Ser. No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Ser. No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
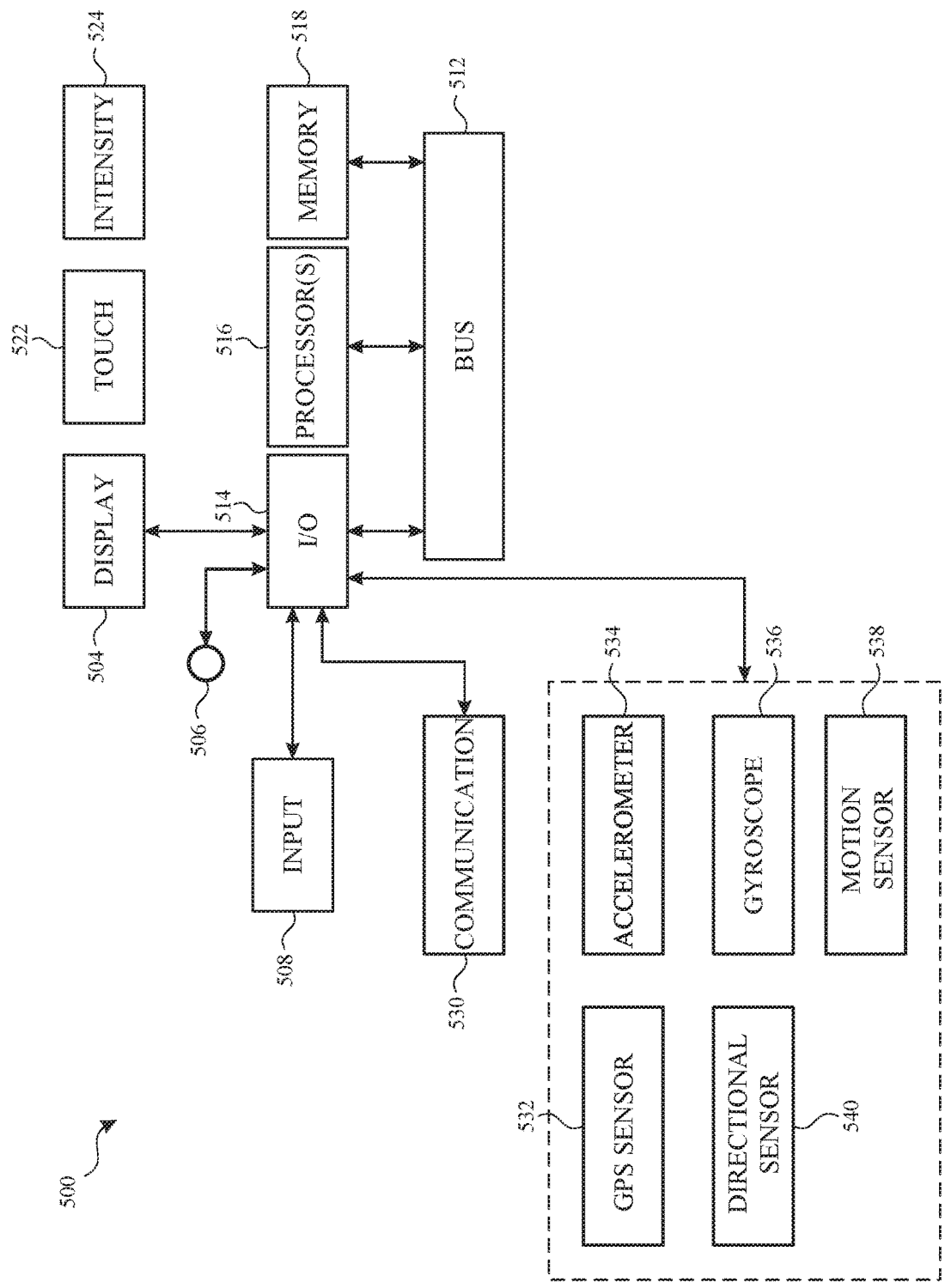
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase of intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6Y illustrate exemplary user interfaces for configuring an account in accordance with some embodiments. The user interfaces in these figures are used to illustrate the processes described below, including the processes in FIG. 7.

FIG. 6A illustrates device 600a displaying, on display 602a, user interface 604a for viewing details of an account for a service (e.g., a payment account, a bank account, a credit card account, a debit card account, and/or a data storage account). User interface 604a includes an affordance 608 for configuring the account for sharing with another user identity associated with the account, such as a family member. In some embodiments, a family member is a second user with which a user of device 600a has established a relationship within an account. In some embodiments, a relationship is established by adding the second user to a list of family members in an account. In some embodiments, the second user is sent a request to be added to the list of family members, and is required to confirm the request prior to being added to the list of family members. In some embodiments, family members include immediate family members, extended family members, friends, co-workers, or any other person who has been added to the list of family members. After adding the second user to the list of family members, one or more features (e.g., photos, subscriptions, calendars, purchases, data storage, and/or applications) accessed with device 600a can be shared with the second user (e.g., one or more features of the account are shared by the family members of the account).

FIG. 6B illustrates device 600a displaying, on display 602a, user interface 610 for configuring shared features with family members. User interface 604a includes a list of family members and an affordance 612 for configuring the account for sharing with a family member.

FIG. 6C illustrates device 600a displaying, on display 602a, user interface 606 for selecting a family member for sharing of the account. In some embodiments, user interface 606 is displayed in response to detecting input 603 (e.g., a tap gesture) corresponding to the location of affordance 608 on display 602a, as shown in FIG. 6A. In some embodiments, user interface 606 is displayed in response to detecting input 605 (e.g., a tap gesture) corresponding to the location of affordance 612 on display 602a, as shown in FIG. 6B.

User interface 606 includes a first family member affordance 616a and a second family member affordance 616b. In some embodiments, the family member affordances included in user interface 606 are a subset of the list of family members. For example, in some embodiments, the family member affordances included in user interface 606 include family members without a personal account for the service. In some embodiments, the family member affordances included in user interface 606 include all family members in the list of family members, as shown in FIG. 6B.

In some embodiments, family member affordances 616a and 616b include account statuses corresponding to the respective family members. For example, as shown in FIG. 6C, the account status for the family member corresponding to affordance 616a is "OFF", indicating that sharing of the account with the respective family member (e.g., "Emily Appleseed") is currently disabled.

FIG. 6D illustrates device 600a displaying, on display 602a, user interface 614a for configuring account settings for a respective family member (e.g., configuring account settings for "Emily Appleseed"). In some embodiments, user interface 614a is displayed in response to detecting input 607 (e.g., a tap gesture) corresponding to the location of affordance 616a on display 602a, as shown in FIG. 6C. User interface 614a includes affordance 618 for enabling sharing of the account with the respective family member.

In some embodiments, in response to detecting input 609 (e.g., a tap gesture) corresponding to the location of affordance 618 (as shown in FIG. 6D), information regarding sharing of the account is displayed in user interface 614a, as shown in FIG. 6E. In some embodiments, the information describes what features the respective family member will have access to if sharing of the account is enabled for the respective family member. As shown in FIG. 6E, user interface 614a also includes affordance 620a for continuing the process for configuring account settings for the respective family member.

FIG. 6F illustrates device 600a displaying, on display 602a, account options 622a and 622b in user interface 614a. In some embodiments, account options 622a and 622b are displayed in response to detecting input 609 (e.g., a tap gesture) corresponding to the location of affordance 618 on display 602a, as shown in FIG. 6D. In some embodiments, account options 622a and 622b are displayed in response to detecting input 611 (e.g., a tap gesture) corresponding to the location of affordance 620a on display 602a, as shown in FIG. 6E. As shown in FIG. 6F, user interface 614a also includes affordance 620b for continuing the process for configuring account settings for the respective family member.

When account option 622a (e.g., "family members only" option) is selected, transfers are permitted between the account and only a first set of user accounts (e.g., only other family members in the list of family members). In some embodiments, account option 622a is selected by default. In some embodiments, an indicator (e.g., a checkmark icon) is displayed to indicate whether the account option 622a is selected. In some embodiments, selecting account option 622a allows the respective family member to use the account to receive money from other family members and/or to send money to other family members (e.g., by transferring account credit between user accounts). In addition, in some embodiments, selecting account option 622a restricts the respective family member from using the account to receive money from anyone who is not a family member or to send money to anyone who is not a family member (e.g., the respective family member cannot use the account to make purchases at retailers or to send money to friends).

In some embodiments, selecting account option 622a allows the respective family member to use the account to receive data quota from other family members and/or to send data quota to other family members (e.g., an amount of storage space available for an online data storage service can be reduced or enlarged by sending or receiving data quota between family members). In addition, in some embodiments, selecting account option 622a restricts the respective family member from using the account to receive data quota from anyone who is not a family member or to send data quota to anyone who is not a family member (e.g., the respective family member cannot use the account to send or receive data quota to anyone other than family members).

When account option 622b (e.g., "everyone" option) is selected, transfers are permitted between the account and anyone using the service (e.g., all user accounts of the service). In some embodiments, an indicator (e.g., a checkmark icon) is displayed to indicate whether the account option 622b is selected. In some embodiments, selecting account option 622b allows the respective family member to use the account to receive money from anyone (e.g., family members and users, entities, or accounts other than family members) and/or to send money to anyone (e.g., by transferring account credit between user accounts or between a user account and a retailer). In some embodiments, selecting account option 622b allows the respective family member to use the account to receive data quota from anyone and/or to send data quota to anyone (e.g., an amount of storage space available for an online data storage service can be reduced or enlarged by sending or receiving data quota).

FIG. 6G illustrates device 600a displaying, on display 602a, selectable options 628a-628c in user interface 614a. In some embodiments, options 628a-628c are displayed in response to detecting input 613 (e.g., a tap gesture) corresponding to the location of affordance 620b on display 602a, as shown in FIG. 6F. As shown in FIG. 6G, user interface 614a also includes affordance 620c for continuing the process for configuring account settings for the respective family member.

When option 628a (e.g., "in-app purchases" option) is selected, transfers are restricted between the account and an account associated with an application on a device associated with the respective family member (e.g., when option 628a is enabled, in-app transactions (e.g., purchasing add-ons to a game) are restricted for the respective family member). In some embodiments, option 628a is selected by default. In some embodiments, an indicator (e.g., a checkmark icon) is displayed to indicate whether the account option 628a is selected.

When option 628b (e.g., "retail stores" option) is selected, transfers are restricted between the account and an account associated with a physical retail store (e.g., when option 628a is enabled, in-person transactions at retail stores are restricted for the respective family member). In some embodiments, an indicator (e.g., a checkmark icon) is displayed to indicate whether the account option 628b is selected.

When account option 628c (e.g., "everywhere" option) is selected, transfers are restricted between the account and all commercial accounts (e.g., when option 628c is enabled, in-app purchases and retail purchases are restricted for the respective family member). In some embodiments, an indicator (e.g., a checkmark icon) is displayed to indicate whether the account option 628c is selected.

FIG. 6H illustrates device 600a displaying, on display 602a, done affordance 632 and send money affordance 634 in user interface 614a. In some embodiments, done affordance 632 and send money affordance 634 are displayed in response to detecting input 615 (e.g., a tap gesture) corresponding to the location of affordance 620c on display 602a, as shown in FIG. 6G. As shown in FIG. 6H, user interface 614a also includes an indication that the account has been enabled for the respective family member (e.g., "account turned on"). Send money affordance 634 allows money to be sent to the respective family member as part of the configuration process for the account. In some embodiments, instead of send money affordance 634, user interface 614a includes a send data quota affordance for providing additional data quota to the respective family member.

As shown in FIG. 6I, in response to detecting input 619 (e.g., a tap gesture) corresponding to the location of send money affordance 634 on display 602a, user interface 636 for entering a value is displayed. User interface 636 includes numeric soft keys for entering a value and send affordance 638 for initiating a process to transfer the entered value to the account. In response to detecting input 621 corresponding to the location of send affordance 638 on display 602a, the value entered in user interface 636 is transferred to the respective family member. In some embodiments, transferring the value includes deducting the value from an account of the user of device 600a and depositing the value to the account being configured for the respective family member.

FIG. 6J illustrates device 600a displaying, on display 602a, indication 642a that the account has been configured for the respective family member and money has been transferred to the account. As shown in FIG. 6J, indication 642a is displayed as a message in messaging user interface 640a (e.g., in a message conversation between the user of device 600a and the respective family member). In some embodiments, indication 642a is displayed in response to detecting input 621 corresponding to the location of send affordance 638 on display 602a, as shown in FIG. 6I.

FIG. 6K illustrates device 600a displaying, on display 602a, indication 642b that the account has been configured for the respective family member. As shown in FIG. 6K, indication 642b is displayed as a notification on user interface 644a (e.g., a lock screen, a wake screen that is displayed when display 602a transitions from an inactive state to an active state, a user interface when device 600a is in an unlocked state). In some embodiments, indication 642b is displayed in response to detecting input 621 corresponding to the location of send affordance 638 on display 602a, as shown in FIG. 6I. In some embodiments, indication 642a is displayed in response to detecting input 619 corresponding to the location of done affordance 632 on display 602a, as shown in FIG. 6H. In some embodiments, indication 642a is not displayed until after the respective family member has provided confirmation (and/or authentication) that the account can be set up for the respective family member, as further described below with respect to FIGS. 6T-6W.

As shown in FIG. 6L, after the account has been configured for the respective family member, the status of the respective family member is updated to indicate that the account is enabled (e.g., the status for Emily Appleseed is "ON"). In some embodiments, the status is updated in response to detecting input 621 corresponding to the location of send affordance 638 on display 602a, as shown in FIG. 6I. In some embodiments, the status is updated in response to detecting input 619 corresponding to the location of done affordance 632 on display 602a, as shown in FIG. 6H. In some embodiments, the status is not changed until after the respective family member has provided confirmation (and/or authentication) that the account can be set up for the respective family member, as further described below with respect to FIGS. 6T-6W.

FIG. 6M illustrates device 600a displaying, on display 602a, user interface 614a for configuring account settings for a respective family member (e.g., configuring account settings for "Emily Appleseed"). In some embodiments, user interface 614a is displayed in response to detecting input 631 (e.g., a tap gesture) corresponding to the location of affordance 616a on display 602a, as shown in FIG. 6L. In contrast to user interface 614a as shown in FIG. 6D, user interface 614a as shown in FIG. 6M includes additional options for configuring account settings for the respective family member. The additional options are included in user interface 614a after the account has been enabled for the respective family members.

User interface 614a as shown in FIG. 6M includes an indication of which account option 622a or 622b was selected during the configuration process for the account, as described above with respect to FIG. 6F. In some embodiments, a different account option 622a or 622b can be selected in user interface 614a as shown in FIG. 6M to change the account setting after the account has been configured for the respective family member. In some embodiments, user interface 614a also includes options 628a-628c and an indication of which option 628a-628c was selected during the configuration process for the account, as described above with respect to FIG. 6G. In some embodiments, a different option 628a-628c can be selected (e.g., via a tap input) in user interface 614a to change the account setting after the account has been configured for the respective family member.

In some embodiments, as shown in FIG. 6M, user interface 614a includes selectable option 646 that, when enabled, causes a notification to be provided when the respective family member makes a purchase. In some embodiments, user interface 614a further includes selectable option 648 that, when enabled, causes a notification to be provided when the respective family member sends or receives money.

In some embodiments, as shown in FIG. 6M, user interface 614a includes send money affordance 634. Send money affordance 634 allows money to be sent to the respective family member after the account has been configured for the respective family member. In some embodiments, instead of a send money affordance 634, user interface 614a includes a send data quota affordance for providing additional data quota to the respective family member. In some embodiments, user interface 614a further includes disable account affordance 650. Disable account affordance 650 allows a user of device 600a to disable the account from being used by the respective family member.

FIG. 6N illustrates device 600a displaying, on display 602a, notification 652 on user interface 644a (e.g., a lock screen, a wake screen that is displayed when display 602a transitions from an inactive state to an active state, a user interface when device 600a is in an unlocked state). Notification 652 provides information about a purchase made by the respective family member using the account. In some embodiments, notification 652 is provided after option 646 as shown in FIG. 6M is enabled.

Figure 6O:
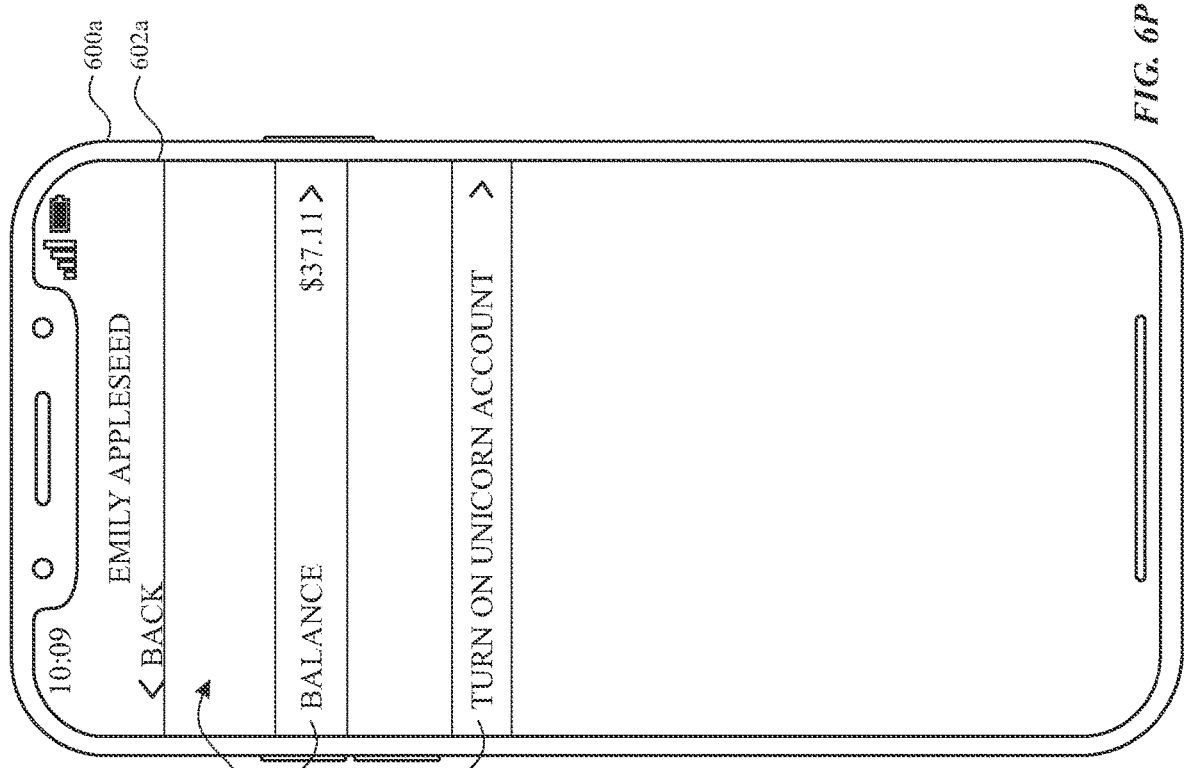
FIGS. 6A-6Y illustrate exemplary user interfaces for configuring an account in accordance with some embodiments.

FIG. 6O illustrates device 600a displaying, on display 602a, confirmation 654 overlaying user interface 614a. Confirmation 654 provides a warning that the account will be disabled for the respective family member. Confirmation 654 is displayed in response to detecting input 623 (e.g., a tap gesture) corresponding to the location of disable account affordance 650, as shown in FIG. 6M. Confirmation 654 includes affordance 656 for continuing with disabling of the account for the respective family member.

Figure 6P:
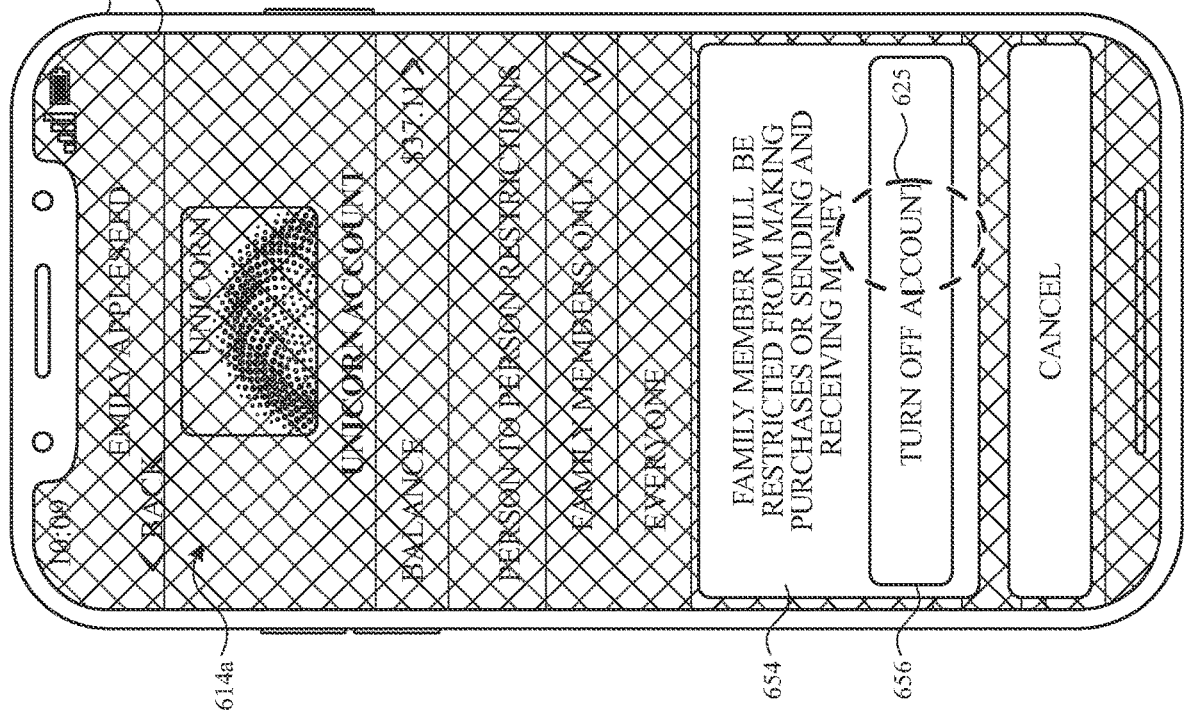

In response to detecting input 625 (e.g., a tap gesture) corresponding to the location of affordance 656, the account is disabled and user interface 614a is updated to include fewer options for configuring the account, as shown in FIG. 6P. In some embodiments, if the account for the respective member includes a remaining balance of money, the balance is included in user interface 614a. The account can be enabled again for the respective family member using affordance 618, as described above with respect to FIGS. 6D-6H. In response to disabling the account, the status for the respective family member is updated to indicate that the account has been disabled, as shown in FIG. 6C (e.g., the status for Emily Appleseed is "OFF").

In some embodiments, as shown in FIG. 6Q, the account status of the respective family member is updated to indicate that the account is pending (e.g., the status for Emily Appleseed is "PENDING"). In some embodiments, the status is updated in response to detecting input 619 corresponding to the location of done affordance 632 on display 602a, as shown in FIG. 6H. In some embodiments, the status is set to pending until the respective family member has provided confirmation (and/or authentication) that the account can be set up for the respective family member, as further described below with respect to FIGS. 6T-6W. After the respective family provides confirmation (and/or authentication), the account status is updated to "ON", as shown in FIG. 6L.

FIG. 6R illustrates device 600b displaying, on display 602b, indication 662a that the account has been configured for the respective family member and money has been transferred to the account. In some embodiments, device 600b is a device associated with the respective family member. As shown in FIG. 6R, indication 662a is displayed as a message in messaging user interface 640b (e.g., in a message conversation between the respective user and the user of device 600a that configured the account). In some embodiments, indication 662a is displayed in response to detecting input 621 corresponding to the location of send affordance 638 on display 602a, as shown in FIG. 6I.

Figure 6S:
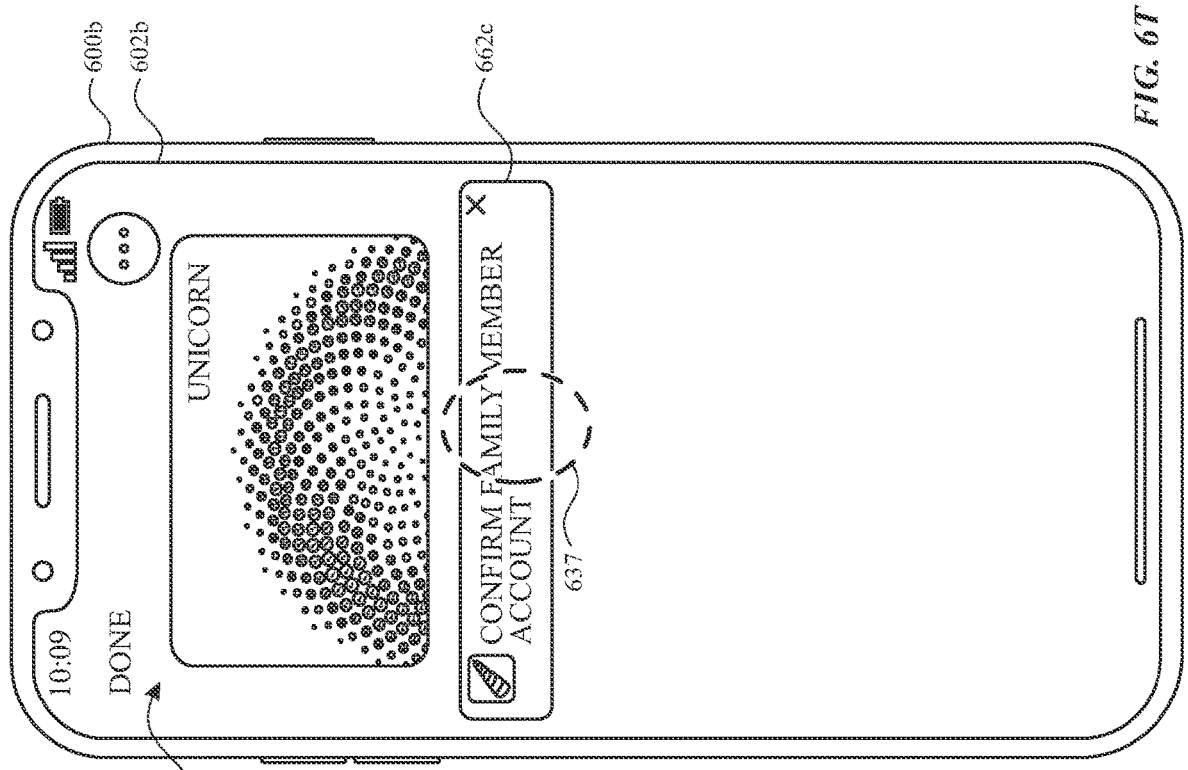

FIG. 6S illustrates device 600b displaying, on display 602b, indication 662b that the account has been configured for the respective family member. As shown in FIG. 6S, indication 662b is displayed as a notification on user interface 644b (e.g., a lock screen, a wake screen that is displayed when display 602a transitions from an inactive state to an active state, a user interface when device 600a is in an unlocked state). In some embodiments, indication 662b is displayed in response to detecting input 621 corresponding to the location of send affordance 638 on display 602a, as shown in FIG. 6I. In some embodiments, indication 642a is displayed in response to detecting input 619 corresponding to the location of done affordance 632 on display 602a, as shown in FIG. 6H.

Figure 6T:
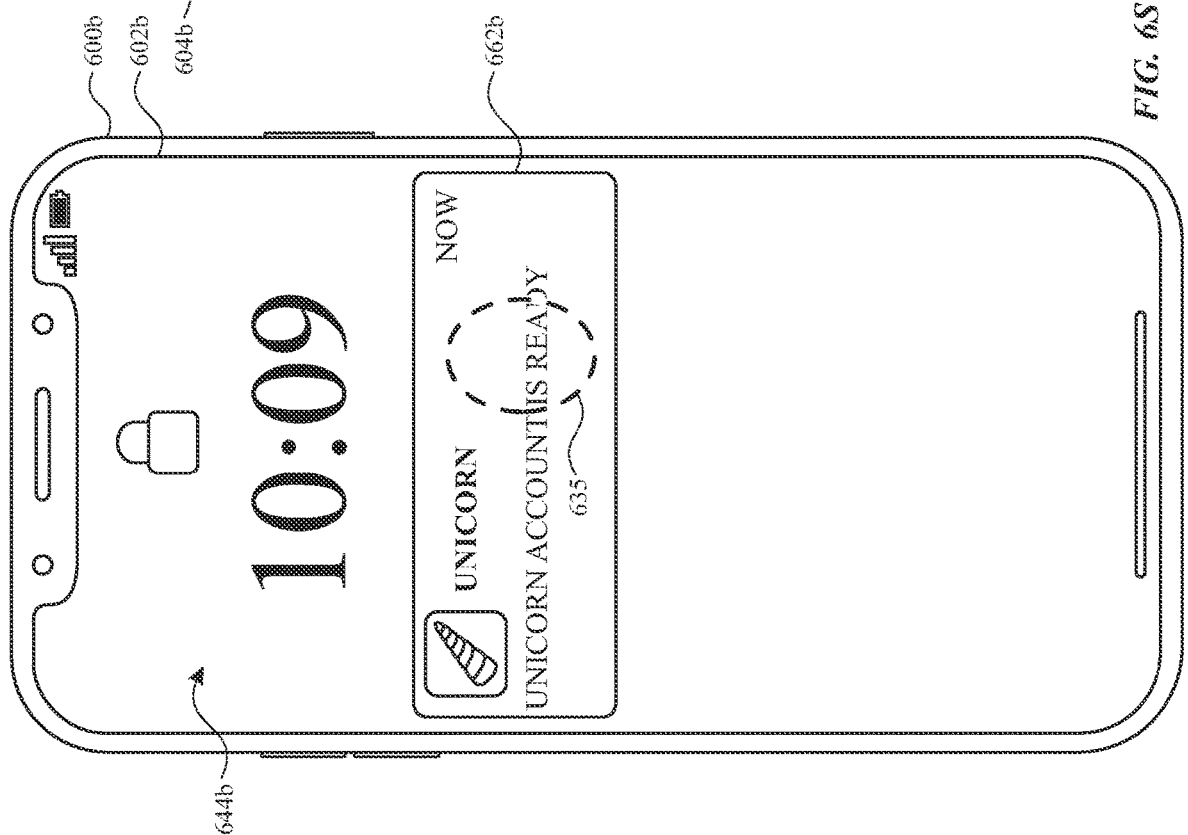
Figure 6V:
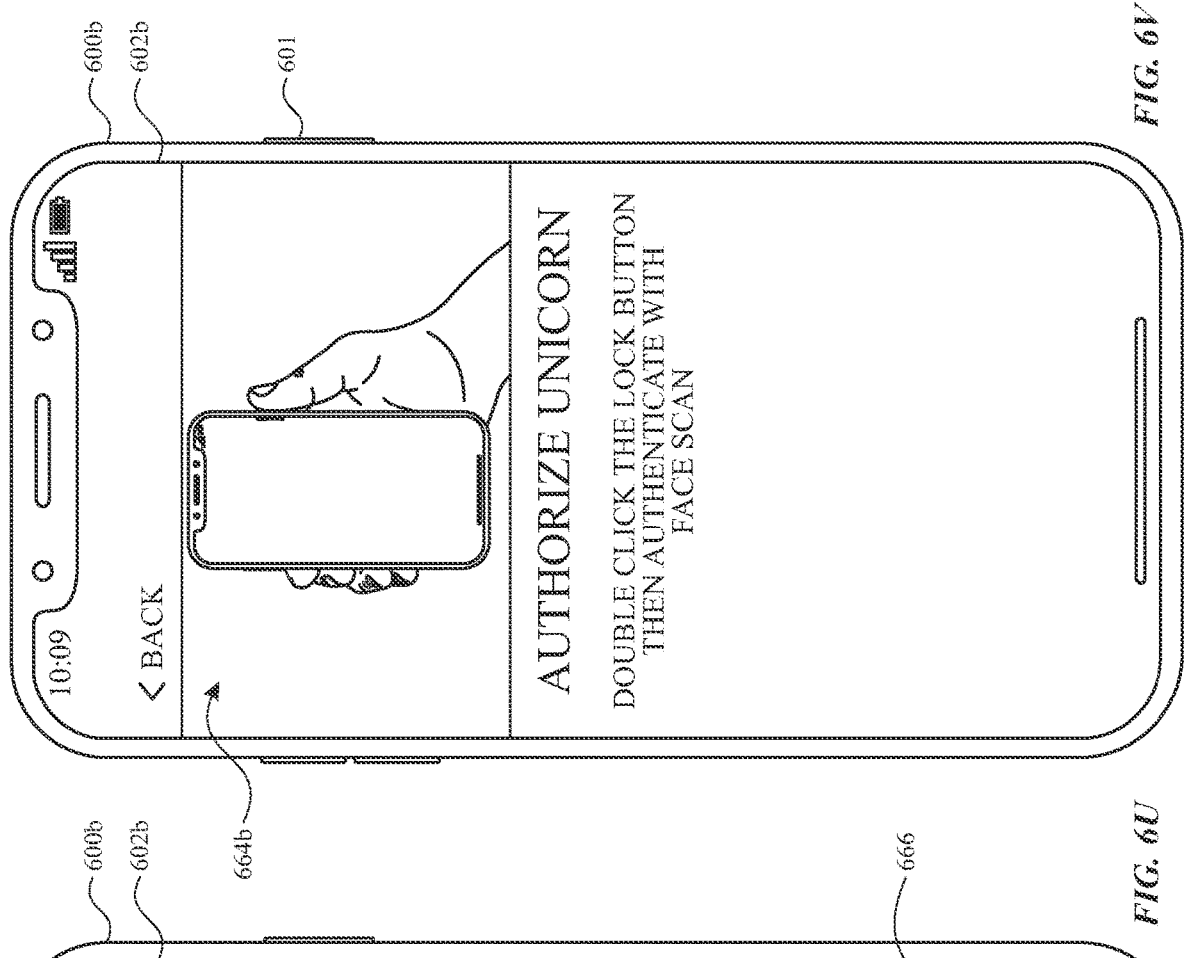

FIG. 6T illustrates device 600b displaying, on display 602b, indication 662c that the account requires confirmation to continue being configured for the respective family member. As shown in FIG. 6T, indication 662c is displayed as a notification in user interface 604b for viewing details of the account. In some embodiments, user interface 604b is displayed in response to detecting input 633 corresponding to the location of indication 662a on display 602b, as shown in FIG. 6R. In some embodiments, user interface 604b is displayed in response to detecting input 635 corresponding to the location of indication 662b on display 602b, as shown in FIG. 6S (and, in some embodiments, after unlocking device 600b).

Figure 6U:
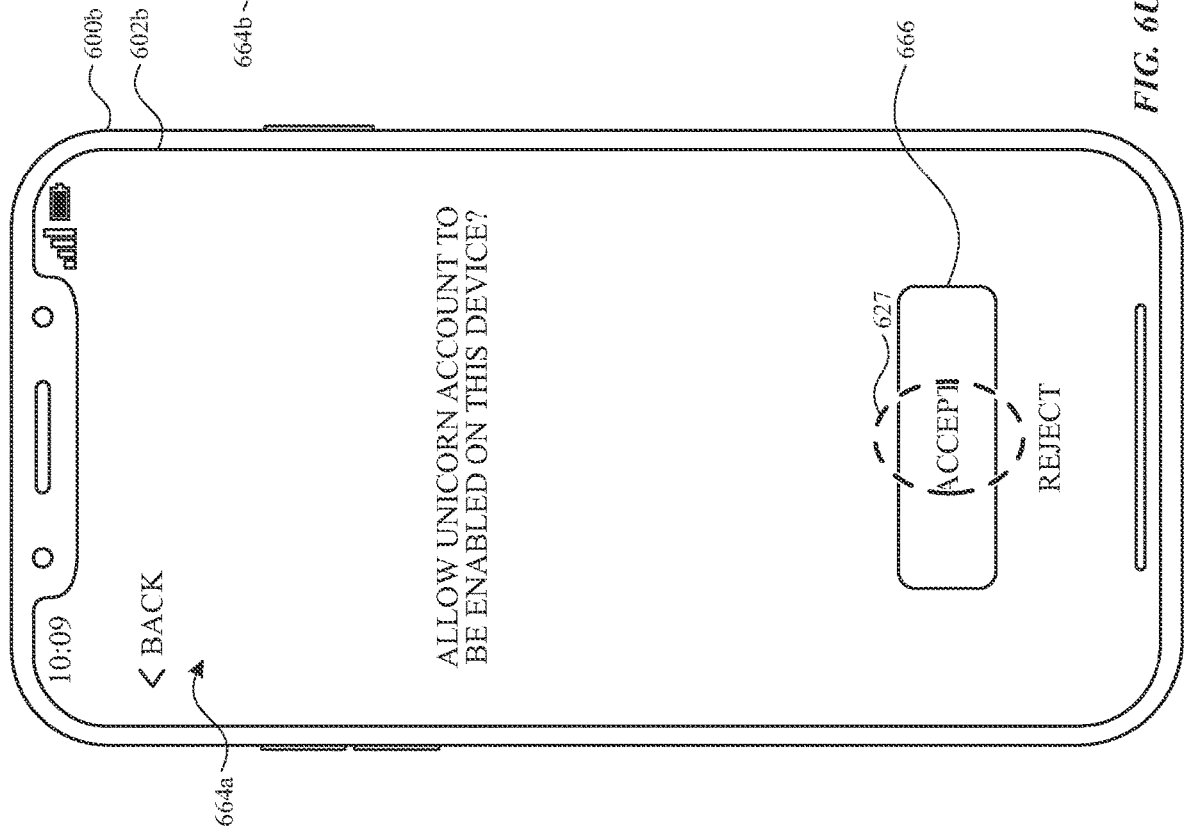
Figure 6Y:
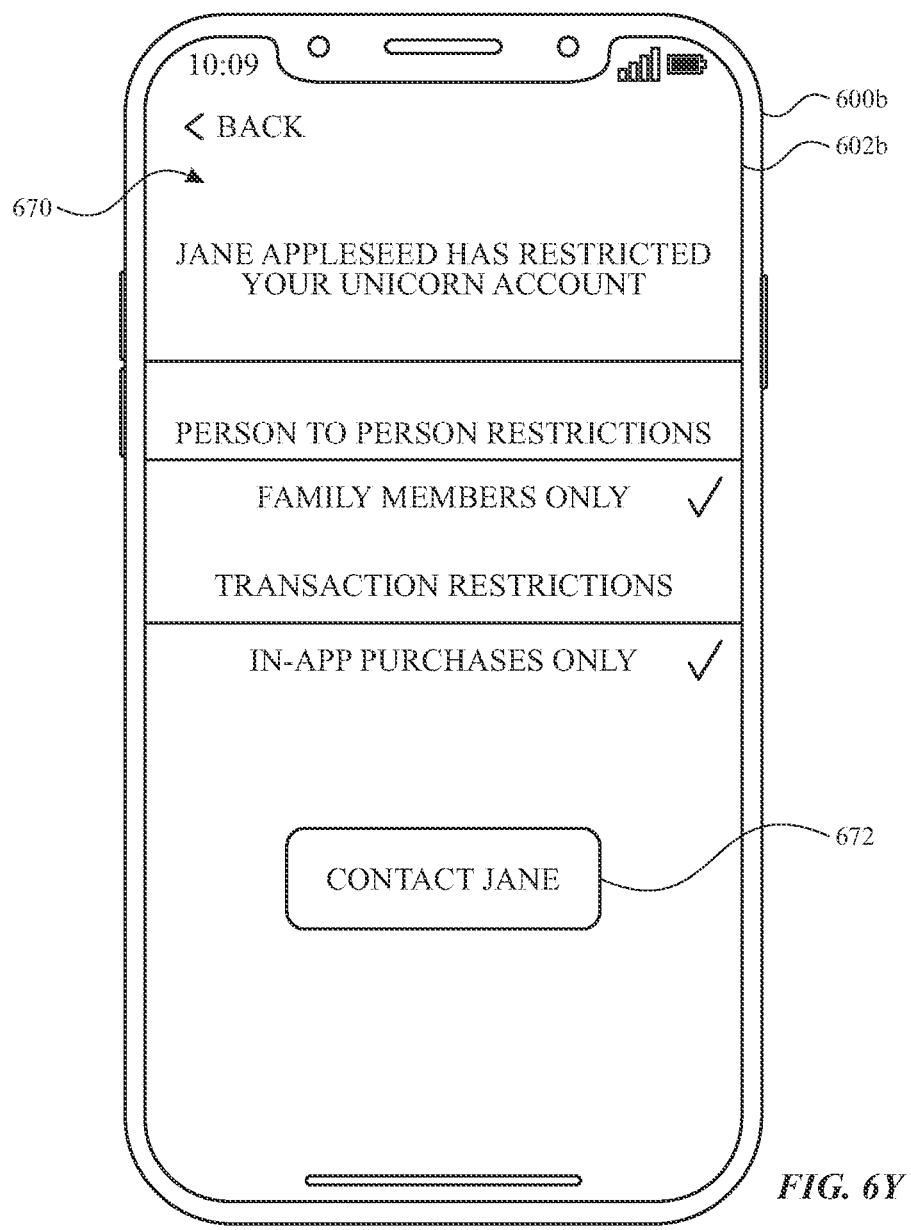

FIG. 6U illustrates device 600b displaying, on display 602b, user interface 664a for confirming that the account can continue being set up for the respective family member. In some embodiments, user interface 664a is displayed in response to detecting input 637 (e.g., a tap gesture) corresponding to the location of indication 662c on display 602b, as shown in FIG. 6T. User interface 664a includes accept affordance 666 for confirming that the account can continue being set up for the respective family member.

In some embodiments, confirming that the account can continue being set up for the respective family member requires authentication of the respective family member. FIG. 6V illustrates device 600b displaying, on display 602b, user interface 664b for authenticating the identity of a user of device 600b. In some embodiments, the identity of the user of device 600b is authenticated using biometric information (e.g., facial recognition, fingerprint recognition). In some embodiments, the identity of the user of device 600b is authenticated using a passcode. In some embodiments, as shown in FIG. 6V, facial recognition is initiated to authenticate the identity of the user of device 600b in response to detecting a double click input on lock button 601.

FIG. 6W illustrates device 600b displaying, on display 602b, user interface 664c confirming that the account has been enabled for the respective family member. In some embodiments, user interface 664c is displayed in response to detecting input 627 (e.g., a tap gesture) corresponding to the location of accept affordance 666 on display 602b, as shown in FIG. 6U. In some embodiments, user interface 664c is displayed in response to determining that the identity of the user of device 600b has been authenticated (e.g., in response detecting a double click input on lock button 601 as shown in FIG. 6V and authenticating the identity of the user of device 600b using facial recognition).

FIG. 6X illustrates device 600b displaying, on display 602b, notification 668 that the account is restricted. As shown in FIG. 6X, notification 668 is displayed in user interface 604b for viewing details of the account. In some embodiments, user interface 604b is displayed in response to detecting input 633 corresponding to the location of indication 662a on display 602b, as shown in FIG. 6R. In some embodiments, user interface 604b is displayed in response to detecting input 635 corresponding to the location of indication 662b on display 602b, as shown in FIG. 6S (and, in some embodiments, after unlocking device 600b). In some embodiments, user interface 604b is displayed after confirming that the account can be enabled for the respective family member, as described with respect to FIGS. 6T-6W.

In some embodiments, in response to detecting input 629 (e.g., a tap gesture) corresponding to the location of notification 668 on display 602b, user interface 670 is displayed, as shown in FIG. 6Y. User interface 670 includes information about restrictions that have been enabled for the account, including the type of restrictions (e.g., person to person transfers are restricted to family members only, purchase transactions are restricted to in-app purchases only) and the user that enabled the restrictions (e.g., "Jane Appleseed has restricted your Unicorn Account"). In some embodiments, user interface 670 includes contactable user affordance 672 for contacting the user that enabled the restrictions (e.g., selecting contactable user affordance 672 will display contact information for Jane Appleseed). FIG. 7 is a flow diagram illustrating a method for configuring an account using a computer system in accordance with some embodiments. Method 700 is performed at a computer system (e.g., 100, 300, 500, 600*a*) having a display generation component (e.g., 602*a*) and one or more input devices (e.g., a touch-sensitive surface). Some operations in method 700 are, optionally, combined, the orders of some operations are, optionally, changed, and some operations are, optionally, omitted.

As described below, method 700 provides an intuitive way for configuring an account for a second user identity. The method reduces the cognitive burden on a user when configuring an account for a second user identity, thereby creating a more efficient human-machine interface. For battery-operated computing devices, enabling a user to configure an account for a second user identity faster and more efficiently conserves power and increases the time between battery charges.

The computer system (e.g., 600*a*) that is associated with a first user identity displays (702), via the display generation component (e.g., 602*a*), a user interface (e.g., 614*a*) for configuring an account (e.g., an account for transferring funds between people or for performing retail transactions and/or a data storage account) for use by one or more devices (e.g., 600*b*) associated with a second user identity (e.g., a device used by a family member). The user interface includes a control for selecting between: a first account option (704) (e.g., 622*a*) (e.g., an option to restrict funds transfers to family members; an option to restrict data sharing to family members) that, when selected, indicates that transfers are permitted between the account and only a first set of user accounts, where the first set of user accounts are associated with a predetermined set of users of the service, and a second account option (706) (e.g., 622*b*) (e.g., an option to permit funds transfers to anyone, including the user's family members; an option to permit data sharing with anyone) that, when selected, indicates that transfers are permitted between the account and a second set of user accounts, where the second set of user accounts includes the first set of user accounts and one or more additional user accounts associated with additional users of the service. In some embodiments, the second set of user accounts includes all user accounts of the service.

In response (708) to detecting, via the one or more input devices, an input corresponding to a request to configure the account (e.g., 613, 615, 619, 621) (e.g., selection of a "continue" affordance on the user interface) and in accordance (710) with a determination that the first account option (e.g., 622*a*) is selected (e.g., the "family members only" option is checked), the computer system transmits (e.g., to a remote server) a request to configure (e.g., create) the account with an account setting corresponding to the first account option (e.g., the account should be restricted to family members when the account is configured). In response (708) to detecting, via the one or more input devices, an input corresponding to a request to configure the account (e.g., 613, 615, 619, 621) (e.g., selection of a "continue" affordance on the user interface) and in accordance (712) with a determination that the second account option (e.g., 622*b*) is currently selected (e.g., the "everyone" option is checked), the computer system transmits (e.g., to a remote server) a request to configure (e.g., create) the account with an account setting corresponding to the second account option (e.g., the account should be unrestricted when the account is configured). In some embodiments, the "family members" only option is checked by default. In some embodiments, the "everyone" option is checked by default.

Displaying a control for selecting between a first account option that, when selected, indicates that transfers are permitted between the account and only a first set of user accounts (e.g., family members only) and a second account option that, when selected, indicates that transfers are permitted between the account and one or more additional user accounts associated with additional users of the service (e.g., all users of the service) provides the user with enhanced control over how the account will be used by the one or more devices associated with the second user identity. Providing enhanced control increases the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, after configuring the account, the computer system displays, via the display generation component, an option (e.g., 634) that, when selected, initiates a process to request a transfer to the account (e.g., transfer money to the account when the account is set up and/or transfer data quota to the account when the account is set up). In some embodiments, the option is displayed after detecting the input (e.g., 613, 615) corresponding to the request to configure the account. Displaying an option that, when selected, initiates a process to request a transfer to the account allows the user to efficiently make a transfer to the account that has been configured without requiring input to navigate additional user interfaces. Reducing the number of inputs needed to perform an operation enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, prior to detecting the input (e.g., 613, 615) corresponding to a request to configure the account, the computer system detects, via the one or more input devices, an input selecting the first account option (e.g., 622*a*) or the second account option (e.g., 622*b*) (e.g., a tap gesture on the "family members only" option or the "everyone" option). Selecting the first account option or the second account option prior to the request to configure the account allows the user to control how the account will be used by the one or more devices associated with the second user identity. Providing additional control options enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system displays, via the display generation component, a user interface (e.g., 606) for viewing one or more user identities (e.g., 616*a*, 616*b*) (e.g., a family view). The user interface includes an indication that one or more user identities are available to have an account configured (e.g., a status by the family member's name indicating whether the family member has an account (e.g., an "OFF" status)). In some embodiments, the user interface (e.g., 606) includes representations of one or more accounts associated with other user identities (e.g.,

616a, 616b). In some embodiments, the indication includes a status of the account (e.g., enabled, disabled, pending approval/authentication (e.g., "ON", "OFF", "PENDING")). Displaying a user interface for viewing one or more user identities that includes an indication that one or more user identities are available to have an account configured provides feedback to the user about the status of the one or more user identities. Providing improved feedback enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, while displaying the user interface (e.g., 606) for viewing one or more user identities, the computer system detects, via the one or more input devices, an input (e.g., 607) selecting the second user identity (e.g., 616a) from the one or more user identities. In response to detecting the input selecting the second user identity, the computer system displays, via the display generation component, a second user interface (e.g., 614a) for configuring the account for use by one or more devices associated with the second user identity. In some embodiments, the second user interface is the user interface (e.g., 614a) for configuring the account for use by one or more devices associated with the second user identity. In some embodiments, after displaying the second user interface, an input (e.g., 609) is detected corresponding to a request to configure the account. Displaying a second user interface for configuring the account for use by one or more devices associated with the second user identity in response to detecting the input selecting the second user identity provides the user with additional control over how the account is configured. Providing additional control enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, subsequent to (e.g., momentarily after; in response to) transmitting the request to configure the account with an account setting corresponding to the first account option or the request to configure the account with an account setting corresponding to the second account option, the computer system provides an indication (e.g., 642a; 642b; "ON" status as shown in FIG. 6L; user interface 614a as shown in FIG. 6H) (e.g., a visual, haptic, and/or audio notification) that the account is available for use by the one or more devices associated with the second user identity (e.g., to transfer funds and/or to share data). In some embodiments, before providing the indication, the computer system receives (e.g., from the remote server) a communication indicating that the account is available for use by the one or more devices associated with the second user identity. Providing the indication that the account is available for use by the one or more devices associated with the second user identity provides visual feedback to the user that the account has been successfully enabled for a device associated with the second user identity. Providing improved visual feedback enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the transfers include transfers of data quota (e.g., remote storage capacity). In some embodiments, the transfers include transfers of money.

In some embodiments, the account is configured for use by the one or more devices (e.g., 600b; a child device) associated with the second user identity (e.g., a child family member) without input at the one or more devices associated with the second user identity (e.g., when the child device is used, the account will be available for transfers without requiring further input). Configuring the account for use by the one or more devices associated with the second user identity without input at the one or more devices associated with the second user identity reduces the number of user inputs needed to configure the account. Reducing the number of inputs needed to perform an operation enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, after (e.g., in response to) detecting the input corresponding to the request to configure the account, the computer system transmits a request to perform a transfer to the account (e.g., in response to input 621) (e.g., a request to transfer money to the account, a request to transfer data quota to the account). In some embodiments, a message (e.g., 662a) (e.g., a text message) indicating the transfer request is displayed at the one or more devices associated with the second user identity. Performing a transfer to the account after the request to configure the account allows the user to easily make a transfer (e.g., of money or a data quota) to the account during the configuration process and without requiring input to navigate additional user interfaces. Reducing the number of inputs needed to perform an operation enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, prior to configuring the account, the computer system requests confirmation (e.g., 662c) from the second user identity (e.g., requests the second user to authenticate) prior to enabling the account to be used by a device (e.g., 600b) associated with the second user identity (e.g., the child needs to log in to the device before the account is configured). Requesting confirmation from the second user identity prior to enabling the account to be used by a device associated with the second user identity provides feedback to the user about whether the second user has accepted the account. Providing improved feedback enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, displaying the user interface (e.g., 614a) for configuring the account includes displaying, via the display generation component, an option (e.g., 628a) that, when selected, causes transfers to be restricted between the account and an account associated with an application on the one or more devices associated with the second user identity (e.g., when the option is enabled, in-app transactions (e.g., purchasing add-ons to a game) are restricted). Displaying an option that, when selected, causes transfers to be restricted between the account and an account associated with an application on the one or more devices associated with the second user identity provides the user with additional control over how the account will be used by the one or more devices associated with the second user identity. Providing additional control enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, displaying the user interface (e.g., 614a) for configuring the account includes displaying, via the display generation component, an option (e.g., 628b) that, when selected, causes transfers to be restricted between the account and an account not associated with an application on the one or more devices associated with the second user identity (e.g., transactions with an account other than an in-app account (e.g., a physical retailer, a person) are restricted when the option is enabled). Displaying an option that, when selected, causes transfers to be restricted between the account and an account not associated with an application on the one or more devices associated with the second user identity provides the user with additional control over how the account will be used by the one or more devices associated with the second user identity. Providing additional control enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, displaying the user interface (e.g., 614a) for configuring the account includes displaying, via the display generation component, an option (e.g., 646, 648) that, when selected, causes a notification (e.g., 652) to be received in response to one or more future transfers between the account and a second account (e.g., when the option is enabled, a message is displayed (e.g., a text message) when the account sends or receives money). In some embodiments, the notification includes one or more of an amount of the transfer and an identification of the second account (e.g., name of merchant, name of application, name of person). Displaying an option that, when selected, causes a notification to be received in response to one or more future transfers between the account and a second account provides the user with additional control over how the account will be monitored. Providing additional control enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, displaying the user interface (e.g., 614a) for configuring the account includes displaying, via the display generation component, an option (e.g., 650) that, when selected, causes the account to be disabled (e.g., when the option is enabled, the account is restricted from sending or receiving money without removing the account). Displaying an option that, when selected, causes the account to be disabled provides the user with additional control over whether the account can be used by the one or more devices associated with the second user identity. Providing additional control enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in response to detecting, via the one or more input devices, an input (e.g., 623) selecting the option (e.g., 650) that, when selected, causes the account to be disabled, the computer system transmits a request for the one or more devices associated with the second user identity to display a notification (e.g., 668) that the account is disabled (e.g., a message that the account has been restricted, and optionally with an indication of who disabled the account). In some embodiments, after transmitting the request (and receiving the request at the one or more devices associated with the second user identity), the one or more devices (e.g., 600b) associated with the second user identity displays a notification (e.g., 668) that the account is disabled. Transmitting a request for the one or more devices associated with the second user identity to display a notification that the account is disabled allows the user to cause a notification without additional input. Reducing the number of inputs needed to perform an operation enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims. As described above, one aspect of the present technology is the gathering and use of data available from various sources configure an account for a second user identity. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an account can be configured based on non-personal information data or a bare minimum amount of personal information, such as the content being requested by the device associated with a user, other non-personal information, or publicly available information.

What is claimed is:

1. A computer system associated with a first user identity, comprising:
    a display generation component;
    one or more input devices;
    one or more processors; and
    memory storing one or more programs configured to be executed by the one or more processors, the one or more programs including instructions for:
        displaying, via the display generation component, a user interface for configuring an account for a service for use by one or more devices associated with a second user identity, wherein displaying the user interface includes concurrently displaying:
            a first graphical user interface object that, when selected by an input detected via the one or more input devices, displays a first indicator; and
            a second graphical user interface object independently selectable from the first graphical user interface object that, when selected by an input detected via the one or more input devices, displays a second indicator;
        while displaying, via the display generation component, the user interface, detecting, via the one or more input devices, an input corresponding to a request to configure the account; and
        in response to detecting the input corresponding to the request to configure the account:
            in accordance with a determination that the first graphical user interface object is currently selected, transmitting a request to configure the account with an account setting corresponding to the first graphical user interface object, wherein:
                transfers are permitted between the account configured with the account setting corresponding to the first graphical user interface object and only a first set of user accounts for the service;
                transfers are restricted between the account configured with the account setting corresponding to the first graphical user interface object and all user accounts for the service other than the first set of user accounts; and
                the first set of user accounts are associated with a predetermined set of users of the service including the first user identity; and in accordance with a determination that the second graphical user interface object is currently selected, transmitting a request to configure the account with an account setting corresponding to the second graphical user interface object, wherein:

transfers are permitted between the account configured with the account setting corresponding to the second graphical user interface object and a second set of user accounts for the service; and the second set of user accounts includes the first set of user accounts and at least one or more additional user accounts associated with additional users of the service.

2. The computer system of claim 1, wherein the one or more programs further include instructions for:

subsequent to transmitting the request to configure the account with an account setting corresponding to the first graphical user interface object or the request to configure the account with an account setting corresponding to the second graphical user interface object, providing an indication that the account is available for use by the one or more devices associated with the second user identity.

3. The computer system of claim 1, wherein the transfers include transfers of data quota.

4. The computer system of claim 1, wherein the transfers include transfers of money.

5. The computer system of claim 1, wherein the one or more programs further include instructions for:

prior to detecting the input corresponding to the request to configure the account, detecting, via the one or more input devices, an input selecting the first graphical user interface object or the second graphical user interface object.

6. The computer system of claim 1, wherein the account is configured for use by the one or more devices associated with the second user identity without input at the one or more devices associated with the second user identity.

7. The computer system of claim 6, wherein the one or more programs further include instructions for:

after detecting the input corresponding to the request to configure the account, transmitting a request to perform a transfer to the account.

8. The computer system of claim 1, wherein the one or more programs further include instructions for:

prior to configuring the account, requesting confirmation from the second user identity prior to enabling the account to be used by a device associated with the second user identity.

9. The computer system of claim 1, wherein the one or more programs further include instructions for:

after configuring the account:
displaying, via the display generation component, an option that, when selected, initiates a process to request a transfer to the account.

10. The computer system of claim 1, wherein displaying the user interface for configuring the account includes:

displaying, via the display generation component, an option that, when selected, causes transfers to be restricted between the account and an account associated with an application on the one or more devices associated with the second user identity.

11. The computer system of claim 1, wherein displaying the user interface for configuring the account includes:

displaying, via the display generation component, an option that, when selected, causes transfers to be restricted between the account and an account not associated with an application on the one or more devices associated with the second user identity.

12. The computer system of claim 1, wherein displaying the user interface for configuring the account includes:

displaying, via the display generation component, an option that, when selected, causes a notification to be received in response to one or more future transfers between the account and a second account.

13. The computer system of claim 12, wherein the notification includes one or more of an amount of the transfer and an identification of the second account.

14. The computer system of claim 1, wherein displaying the user interface for configuring the account includes:

displaying, via the display generation component, an option that, when selected, causes the account to be disabled.

15. The computer system of claim 14, wherein the one or more programs further include instructions for:

in response to detecting, via the one or more input devices, an input selecting the option that, when selected, causes the account to be disabled, transmitting a request for the one or more devices associated with the second user identity to display a notification that the account is disabled.

16. The computer system of claim 1, wherein the one or more programs further include instructions for:

displaying, via the display generation component, a user interface for viewing one or more user identities, the user interface including an indication that one or more user identities are available to have an account configured.

17. The computer system of claim 16, wherein the indication includes a status of the account.

18. The computer system of claim 16, wherein the one or more programs further include instructions for:

while displaying the user interface for viewing one or more user identities, detecting, via the one or more input devices, an input selecting the second user identity from the one or more user identities; and in response to detecting the input selecting the second user identity, displaying, via the display generation component, a second user interface for configuring the account for use by one or more devices associated with the second user identity.

19. The computer system of claim 1, wherein transmitting the request to configure the account with an account setting corresponding to the first graphical user interface object includes transmitting the request to configure the account with an account setting corresponding to the first graphical user interface object to a remote server associated with the service and further associated with the first user identity and the second user identity.

20. The computer system of claim 1, wherein the one or more additional users of the service do not have an established relationship with the first user identity.

21. A non-transitory computer-readable storage medium storing one or more programs configured to be executed by one or more processors of a computer system that is associated with a first user identity, the computer system having a display generation component and one or more input devices, the one or more programs including instructions for:

displaying, via the display generation component, a user interface for configuring an account for a service for use by one or more devices associated with a second user identity, wherein displaying the user interface includes concurrently displaying:
- a first graphical user interface object that, when selected by an input detected via the one or more input devices, displays a first indicator; and
- a second graphical user interface object independently selectable from the first graphical user interface object that, when selected by an input detected via the one or more input devices, displays a second indicator;

while displaying, via the display generation component, the user interface, detecting, via the one or more input devices, an input corresponding to a request to configure the account; and in response to detecting the input corresponding to the request to configure the account:
- in accordance with a determination that the first graphical user interface object is currently selected, transmitting a request to configure the account with an account setting corresponding to the first graphical user interface object, wherein:
  - transfers are permitted between the account configured with the account setting corresponding to the first graphical user interface object and only a first set of user accounts for the service;
  - transfers are restricted between the account configured with the account setting corresponding to the first graphical user interface object and all user accounts for the service other than the first set of user accounts; and
  - the first set of user accounts are associated with a predetermined set of users of the service including the first user identity; and
- in accordance with a determination that the second graphical user interface object is currently selected, transmitting a request to configure the account with an account setting corresponding to the second graphical user interface object, wherein:
  - transfers are permitted between the account configured with the account setting corresponding to the second graphical user interface object and a second set of user accounts for the service; and
  - the second set of user accounts includes the first set of user accounts and at least one or more additional user accounts associated with additional users of the service.

22. The non-transitory computer-readable storage medium of claim 21, wherein the one or more programs further include instructions for:
subsequent to transmitting the request to configure the account with an account setting corresponding to the first graphical user interface object or the request to configure the account with an account setting corresponding to the second graphical user interface object, providing an indication that the account is available for use by the one or more devices associated with the second user identity.

23. The non-transitory computer-readable storage medium of claim 21, wherein the one or more programs further include instructions for:
prior to detecting the input corresponding to the request to configure the account, detecting, via the one or more input devices, an input selecting the first graphical user interface object or the second graphical user interface object.

24. The non-transitory computer-readable storage medium of claim 21, wherein the account is configured for use by the one or more devices associated with the second user identity without input at the one or more devices associated with the second user identity.

25. The non-transitory computer-readable storage medium of claim 24, wherein the one or more programs further include instructions for:
after detecting the input corresponding to the request to configure the account, transmitting a request to perform a transfer to the account.

26. The non-transitory computer-readable storage medium of claim 21, wherein the one or more programs further include instructions for:
prior to configuring the account, requesting confirmation from the second user identity prior to enabling the account to be used by a device associated with the second user identity.

27. The non-transitory computer-readable storage medium of claim 21, wherein the one or more programs further include instructions for:
after configuring the account:
displaying, via the display generation component, an option that, when selected, initiates a process to request a transfer to the account.

28. The non-transitory computer-readable storage medium of claim 21, wherein displaying the user interface for configuring the account includes:
displaying, via the display generation component, an option that, when selected, causes transfers to be restricted between the account and an account associated with an application on the one or more devices associated with the second user identity.

29. The non-transitory computer-readable storage medium of claim 21, wherein displaying the user interface for configuring the account includes:
displaying, via the display generation component, an option that, when selected, causes transfers to be restricted between the account and an account not associated with an application on the one or more devices associated with the second user identity.

30. The non-transitory computer-readable storage medium of claim 21, wherein displaying the user interface for configuring the account includes:
displaying, via the display generation component, an option that, when selected, causes a notification to be received in response to one or more future transfers between the account and a second account.

31. The non-transitory computer-readable storage medium of claim 21, wherein displaying the user interface for configuring the account includes:
displaying, via the display generation component, an option that, when selected, causes the account to be disabled.

32. The non-transitory computer-readable storage medium of claim 31, wherein the one or more programs further include instructions for:
in response to detecting, via the one or more input devices, an input selecting the option that, when selected, causes the account to be disabled, transmitting a request for the one or more devices associated with the second user identity to display a notification that the account is disabled.

33. The non-transitory computer-readable storage medium of claim 21, wherein the one or more programs further include instructions for:

displaying, via the display generation component, a user interface for viewing one or more user identities, the user interface including an indication that one or more user identities are available to have an account configured.

34. The non-transitory computer-readable storage medium of claim 21, wherein transmitting the request to configure the account with an account setting corresponding to the first graphical user interface object includes transmitting the request to configure the account with an account setting corresponding to the first graphical user interface object to a remote server associated with the service and further associated with the first user identity and the second user identity.

35. The non-transitory computer-readable storage medium of claim 21, wherein the one or more additional users of the service do not have an established relationship with the first user identity.

36. A method, comprising:
at a computer system that is associated with a first user identity, the computer system having a display generation component and one or more input devices:
 displaying, via the display generation component, a user interface for configuring an account for a service for use by one or more devices associated with a second user identity, wherein displaying the user interface includes concurrently displaying:
  a first graphical user interface object that, when selected by an input detected via the one or more input devices, displays a first indicator; and
  a second graphical user interface object independently selectable from the first graphical user interface object that, when selected by an input detected via the one or more input devices, displays a second indicator;
 while displaying, via the display generation component, the user interface, detecting, via the one or more input devices, an input corresponding to a request to configure the account; and
 in response to detecting the input corresponding to the request to configure the account:
  in accordance with a determination that the first graphical user interface object is currently selected, transmitting a request to configure the account with an account setting corresponding to the first graphical user interface object, wherein:
   transfers are permitted between the account configured with the account setting corresponding to the first graphical user interface object and only a first set of user accounts for the service;
   transfers are restricted between the account configured with the account setting corresponding to the first graphical user interface object and all user accounts for the service other than the first set of user accounts; and
   the first set of user accounts are associated with a predetermined set of users of the service including the first user identity; and
  in accordance with a determination that the second graphical user interface object is currently selected, transmitting a request to configure the account with an account setting corresponding to the second graphical user interface object, wherein:
   transfers are permitted between the account configured with the account setting corresponding to the second graphical user interface object and a second set of user accounts for the service; and
   the second set of user accounts includes the first set of user accounts and at least one or more additional user accounts associated with additional users of the service.

37. The method of claim 36, further comprising:
subsequent to transmitting the request to configure the account with an account setting corresponding to the first graphical user interface object or the request to configure the account with an account setting corresponding to the second graphical user interface object, providing an indication that the account is available for use by the one or more devices associated with the second user identity.

38. The method of claim 36, further comprising:
prior to detecting the input corresponding to the request to configure the account, detecting, via the one or more input devices, an input selecting the first graphical user interface object or the second graphical user interface object.

39. The method of claim 36, wherein the account is configured for use by the one or more devices associated with the second user identity without input at the one or more devices associated with the second user identity.

40. The method of claim 39, further comprising:
after detecting the input corresponding to the request to configure the account, transmitting a request to perform a transfer to the account.

41. The method of claim 36, further comprising:
prior to configuring the account, requesting confirmation from the second user identity prior to enabling the account to be used by a device associated with the second user identity.

42. The method of claim 36, further comprising:
after configuring the account:
 displaying, via the display generation component, an option that, when selected, initiates a process to request a transfer to the account.

43. The method of claim 36, wherein displaying the user interface for configuring the account includes:
displaying, via the display generation component, an option that, when selected, causes transfers to be restricted between the account and an account associated with an application on the one or more devices associated with the second user identity.

44. The method of claim 36, wherein displaying the user interface for configuring the account includes:
displaying, via the display generation component, an option that, when selected, causes transfers to be restricted between the account and an account not associated with an application on the one or more devices associated with the second user identity.

45. The method of claim 20, wherein displaying the user interface for configuring the account includes:
displaying, via the display generation component, an option that, when selected, causes a notification to be received in response to one or more future transfers between the account and a second account.

46. The method of claim 36, wherein displaying the user interface for configuring the account includes:
displaying, via the display generation component, an option that, when selected, causes the account to be disabled.

47. The method of claim 46, further comprising:
in response to detecting, via the one or more input devices, an input selecting the option that, when selected, causes the account to be disabled, transmitting a request for the one or more devices associated with the second user identity to display a notification that the account is disabled.

48. The method of claim 36, further comprising:
displaying, via the display generation component, a user interface for viewing one or more user identities, the user interface including an indication that one or more user identities are available to have an account configured.

49. The method of claim 36, wherein transmitting the request to configure the account with an account setting corresponding to the first graphical user interface object includes transmitting the request to configure the account with an account setting corresponding to the first graphical user interface object to a remote server associated with the service and further associated with the first user identity and the second user identity.

50. The method of claim 36, wherein the one or more additional users of the service do not have an established relationship with the first user identity.

* * * * *

UNITED STATES PATENT AND TRADEMARK OFFICE
CERTIFICATE OF CORRECTION

PATENT NO. : 12,118,562 B2
APPLICATION NO. : 17/101941
DATED : October 15, 2024
INVENTOR(S) : Mischa McLachlan Page 1 of 1

It is certified that error appears in the above-identified patent and that said Letters Patent is hereby corrected as shown below:

In the Claims

In Column 50, Line 57, Claim 45, delete "claim 20," and insert -- claim 36, --, therefor.

Signed and Sealed this
Twenty-fifth Day of March, 2025

Coke Morgan Stewart
*Acting Director of the United States Patent and Trademark Office*